(12) United States Patent
Yamazaki et al.

(10) Patent No.: US 11,005,400 B2
(45) Date of Patent: May 11, 2021

(54) MOTOR CURRENT CONTROL DEVICE AND MOTOR CURRENT CONTROL METHOD

(71) Applicant: MINEBEA MITSUMI Inc., Nagano (JP)

(72) Inventors: Kei Yamazaki, Tokyo (JP); Tetsuya Seki, Fukuroi (JP); Shigeki Miyaji, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/617,078

(22) PCT Filed: May 30, 2018

(86) PCT No.: PCT/JP2018/020869
§ 371 (c)(1),
(2) Date: Nov. 26, 2019

(87) PCT Pub. No.: WO2018/221628
PCT Pub. Date: Dec. 6, 2018

(65) Prior Publication Data
US 2020/0083827 A1    Mar. 12, 2020

(30) Foreign Application Priority Data

May 31, 2017   (JP) .............................. JP2017-108551

(51) Int. Cl.
*H02P 8/32*        (2006.01)
*H02P 8/22*        (2006.01)

(52) U.S. Cl.
CPC .  *H02P 8/32* (2013.01); *H02P 8/22* (2013.01)

(58) Field of Classification Search
CPC .... H02P 8/12; H02P 8/32; B41J 19/18; B65H 5/06
See application file for complete search history.

(56) References Cited

U.S. PATENT DOCUMENTS 5,677,607 A  * 10/1997 Sugiyama ............... H02P 25/08
                                                        318/254.2
5,796,226 A  *  8/1998 Ookawa .................... H02P 6/15
                                                        318/254.1
(Continued)

FOREIGN PATENT DOCUMENTS

JP        09-219995 A     8/1997
JP      2000-125593 A     4/2000
(Continued)

OTHER PUBLICATIONS

International Preliminary Report on Patentability for corresponding International Application No. PCT/JP2018/020869 dated Dec. 3, 2019.

(Continued)

*Primary Examiner* — Said Bouziane
(74) *Attorney, Agent, or Firm* — Pearne & Gordon LLP

(57) ABSTRACT

In order to suppress high-frequency noise in micro-step driving of a stepping motor, a motor control device (100) includes an H bridge circuit (20) and control means for driving a switching element of the H bridge circuit (20) with a PWM signal and for setting a charge mode, a fast attenuation mode, or a slow attenuation mode for a motor coil. In a range from an electrical angle where the reference current value starts descending to an electrical angle of +52°, the control means switches the H bridge circuit (20) every PWM cycle to the charge mode and then to the slow attenuation mode. In a range exceeding +52° and to +90 degrees where the reference current value starts ascending, the control means switches the H bridge circuit (20) every PWM cycle to the charge mode and, if the motor current exceeds the reference current value, then the control means switches it to the fast attenuation mode and further to the slow attenuation mode.

5 Claims, 15 Drawing Sheets

(56) References Cited

U.S. PATENT DOCUMENTS

| | | | | |
|---|---|---|---|---|
| 8,564,230 | B2* | 10/2013 | Dwersteg | ............... H02P 8/12 318/400.15 |
| 2015/0028790 | A1* | 1/2015 | Qu | ....................... H02P 8/12 318/696 |
| 2015/0303850 | A1* | 10/2015 | Nagaraj | ................ H02P 7/29 318/696 |
| 2016/0218648 | A1 | 7/2016 | Hijikata | |
| 2016/0218649 | A1* | 7/2016 | Hijikata | ................ H02P 8/32 |

FOREIGN PATENT DOCUMENTS

| | | | |
|---|---|---|---|
| JP | 2002-204150 A | 7/2002 |
| JP | 2014-053997 A | 3/2014 |
| JP | 2016-135077 A | 7/2016 |
| JP | 2016-140205 A | 8/2016 |

OTHER PUBLICATIONS

English translation of Written Opinion for corresponding International Application No. PCT/JP2018/020869 dated Aug. 28, 2018.
International Search Report for corresponding International Application No. PCT/JP2018/020869 dated Aug. 28, 2018.
Written Opinion for corresponding International Application No. PCT/JP2018/020869 dated Aug. 28, 2018.

* cited by examiner

| PWM CYCLE NUMBER | 1 | 2 | 3 | ... | 54 | ... | 90 |
|---|---|---|---|---|---|---|---|
| ELECTRICAL ANGLE | 90° | 91° | 92° | ... | 143° | ... | 179° |
| PREVIOUS CHARGE MODE TIME TON_o | — | — | — | ... | $TON\_o_{54}$ | ... | $TON\_o_{90}$ |
| PRESENT CHARGE MODE TIME TON | — | — | — | ... | $TON_{54}$ | ... | $TON_{90}$ |
| ATTENUATION MODE SWITCHING TIME Tfs | — | — | — | ... | $Tfs_{54}$ | ... | $Tfs_{90}$ |

MOTOR CURRENT CONTROL DEVICE AND MOTOR CURRENT CONTROL METHOD

TECHNICAL FIELD

The present invention relates to a motor current control device and a motor current control method.

BACKGROUND ART

When an inductive load such as a motor coil is current-driven by an H bridge circuit, PWM (Pulse Width Modulation) control is often used. PWM control is for performing current control by repeating charge and discharge (attenuation) of current with respect to the load.

As an exemplary motor driving based on such PWM control, there is a technique described in Patent Literature 1, for example. The problem in the abstract of Patent Literature 1 includes a description of "when constant current control is performed by repeating charge and discharge of current to a reactance load by an H bridge circuit installed on an IC, accurate current control can be performed and the pulsating flow of the load current can be reduced." The solution in the abstract of Patent Literature 1 includes a description of "includes an H bridge circuit for driving a coil load L connected to a pair of external output terminals 15 and 16, a PWM control circuit 20 for switching and driving output switch elements 11 to 14 of the H bridge circuit with a PWM signal and capable of selectively setting a charge mode, a slow attenuation mode, and a fast attenuation mode for the load by the H bridge circuit, a first current detection circuit 21 that detects the load current having dropped below a first setting current value in the fast attenuation mode for the load, and an output control logic circuit 23 that generates a control signal for controlling switching to the slow attenuation mode in response to the detection output and controls the PWM control circuit."

Meanwhile, as a method for driving the motor described above, micro-step driving is known as a method smallness in residual vibration and excellent in stability, during the rotation of a rotor, particularly at the time of low-speed rotation. This method includes PWM controlling a switching element of the H bridge circuit so that the motor current is controlled to be the same as a reference current curve having a substantially sinusoidal shape, thereby realizing the constant current control. Here, the substantially sinusoidal reference current curve is derived from a positional relationship between the rotor and a stator. Hereinafter, the reference current curve is referred to as "reference current". The reference current causes a change every period obtained by dividing a basic step angle (for example, one rotation) by n. This period is referred to as "micro-step", which is constituted by a single or plural PWM cycles. According to the micro-step driving method, a microcomputer or the like can easily generate stepped current that changes stepwise.

DOCUMENT LIST

Patent Literature

Patent Literature 1: Japanese Patent Application Laid-Open No. 2002-204150

SUMMARY OF INVENTION

Technical Problem

The PWM frequency of a stepping motor is 20 KHz to 40 KHz, and there is a problem that high-frequency noise in an audible range is generated when the stepping motor is driven. It is conceivable to use a soundproof material or the like to suppress the high-frequency noise. However, this induces another problem of a new component required and an increase in cost.

As another method for suppressing the high-frequency noise, for example, it is conceivable to increase the PWM frequency by shortening the PWM cycle. However, since an expensive microcomputer is required to shorten the PWM cycle, the problem that the cost will increase still remain. In addition, shortening the PWM cycle will increase the load of the microcomputer and therefore the use of a dedicated motor driver or an expensive microcomputer will be required. As a result, the cost increases.

Hence, the present invention intends to suppress high-frequency noise in micro-step driving of a stepping motor.

Solution to Problem

To solve the above-mentioned problem, a motor current control device according to the present invention includes an H bridge circuit having a switching element and connected to a motor coil provided in a motor, and control means for driving the switching element every predetermined PWM cycle and designating, for the H bridge circuit, an operation mode as any one of a charge mode for increasing motor current flowing in the motor coil, a fast attenuation mode for attenuating the motor current, and a slow attenuation mode for attenuating the motor current at a rate slower than the rate in the fast attenuation mode.

The control means sets a reference current value for each PWM cycle from a positional relationship between a rotor and a stator, in a range from an electrical angle where the reference current value starts descending to a predetermined electrical angle, the control means switches the H bridge circuit to the charge mode and subsequently switches to the slow attenuation mode, for each PWM cycle, and in a range from the predetermined electrical angle to an electrical angle where the reference current value starts ascending, if the motor current exceeds the reference current value after switching to the charge mode, the control means switches the H bridge circuit to the fast attenuation mode and further the slow attenuation mode, for each PWM cycle.

A motor current control method according to the present invention is executed by a motor current control device including an H bridge circuit having a switching element and connected to a motor coil provided in a motor and control means for driving the switching element every predetermined PWM cycle and designating, for the H bridge circuit, an operation mode as any one of a charge mode for increasing motor current flowing in the motor coil, a fast attenuation mode for attenuating the motor current, and a slow attenuation mode for attenuating the motor current at a rate slower than the rate in the fast attenuation mode.

The control means executes a step of setting a reference current value for each PWM cycle from a positional relationship between a rotor and a stator, in a range from an electrical angle where the reference current value starts descending to a predetermined electrical angle, the control means executes a step of switching the H bridge circuit to the slow attenuation mode after a step of switching to the charge mode, for each PWM cycle, and in a range from the predetermined electrical angle to an electrical angle where the reference current value starts ascending, if the motor current exceeds the reference current value after the step of switching the H bridge circuit to the charge mode, the control means executes a step of switching to the fast attenuation mode and further a step of switching to the slow attenuation mode, for each PWM cycle.

Effects of Invention

According to the present invention, high-frequency noise can be suppressed in micro-step driving of a stepping motor.

DESCRIPTION OF EMBODIMENTS

Hereinafter, embodiments for carrying out the present invention will be described in detail with reference to attached drawings.

Figure 1:
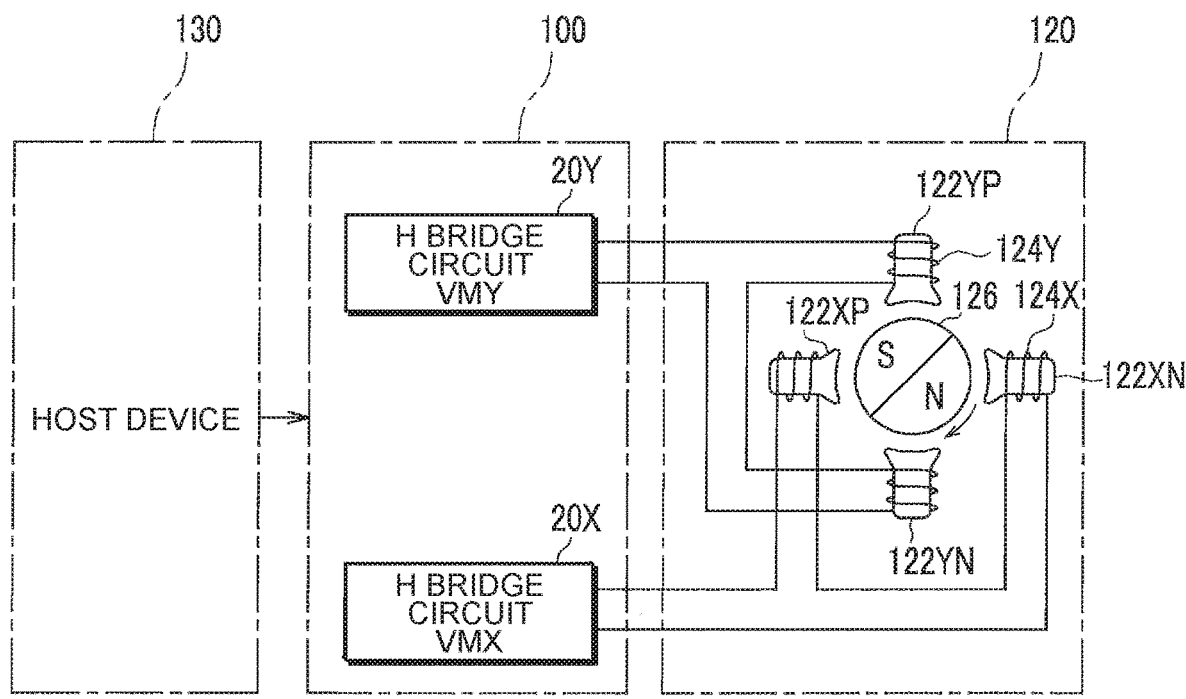
FIG. 1 An entire block diagram illustrating a motor control system according to an embodiment of the invention.

FIG. 1 is an entire block diagram illustrating a motor control system according to an embodiment of the invention.

In FIG. 1, a motor 120 is a bipolar two-phase stepping motor that has a rotor 126 having a permanent magnet and rotatably provided, and stators provided at positions that divide the circumferential direction around the rotor 126 into four equal parts. These stators are composed of X-phase stators 122XP and 122XN and Y-phase stators 122YP and 122YN. The stator 122XP and the stator 122XN are positioned on opposite sides of the rotor 126. The stator 122YP and the stator 122YN are positioned on opposite sides of the rotor 126, and are oriented in a direction perpendicular to the direction of the stator 122XP and the stator 122XN.

Windings are wound around these stators in the same direction. The windings wound around the stators 122XP and 122XN are connected in series, and these two windings are collectively referred to as "stator winding 124X". Similarly, the windings wound around the stators 122YP and 122YN are connected in series, and these two windings are collectively referred to as "stator winding 124Y".

A host device 130 outputs a speed command signal for commanding the rotational speed of the motor 120. A motor control device 100 (an exemplary motor current control device) drives and controls the motor 120 according to the speed command signal. The motor control device 100 is provided with H bridge circuits 20X and 20Y, which apply X-phase voltage VMX and Y-phase voltage VMY to the stator windings 124X and 124Y, respectively.

Figure 2:
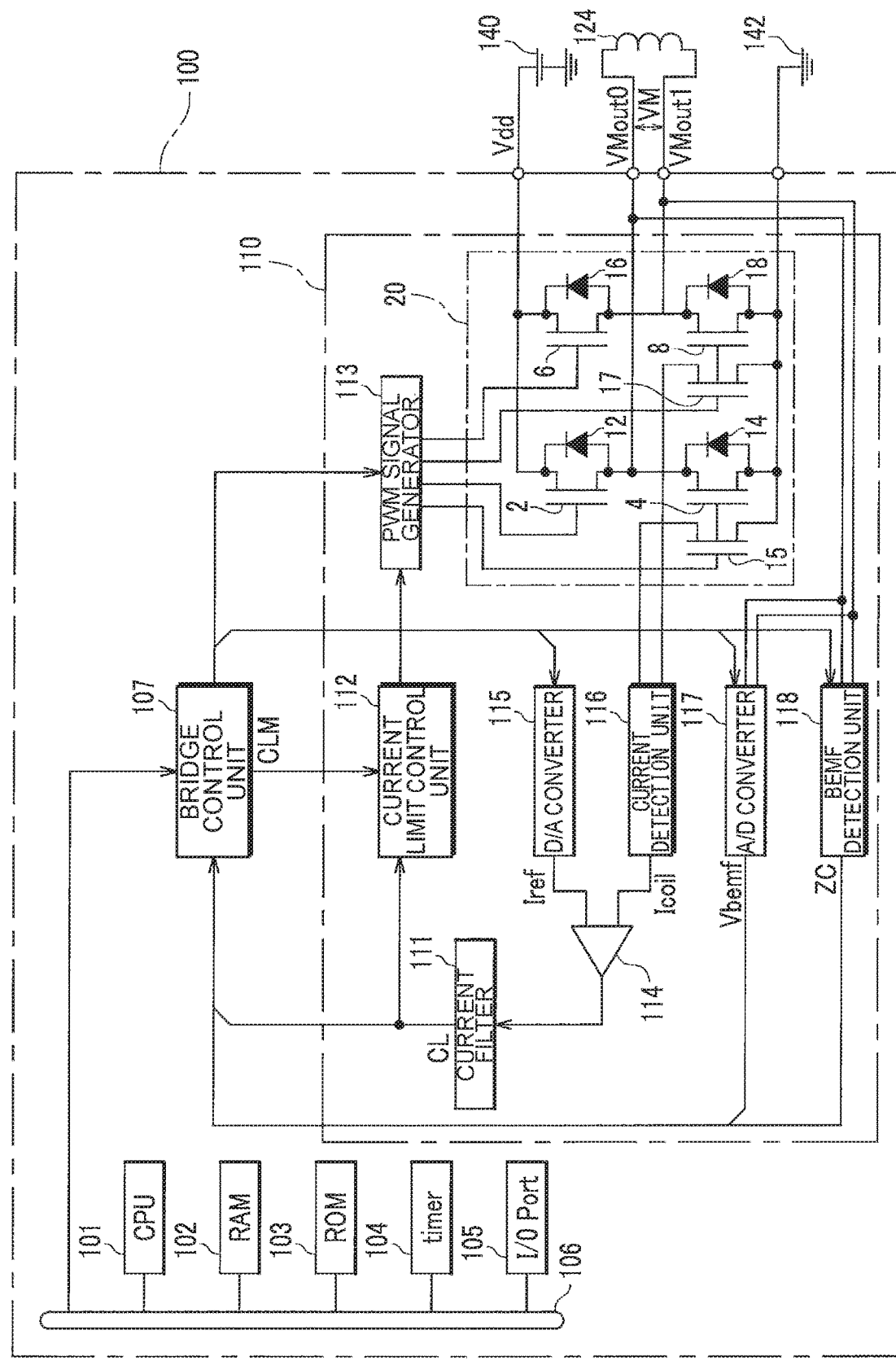
FIG. 2 A detailed block diagram illustrating a motor control device.

FIG. 2 is a detailed block diagram illustrating the motor control device 100.

Although FIG. 1 illustrates two stator windings 124X and 124Y and two H bridge circuits 20X and 20Y, FIG. 2 illustrates a single stator winding 124 and a single H bridge circuit 20 for simplification.

A CPU (Central Processing Unit) 101 is provided inside the motor control device 100. The CPU 101 controls each unit via a bus 106 based on a control program stored in a ROM (Read Only Memory) 103. A RAM (Random Access Memory) 102 is usable as a work memory for the CPU 101. A timer 104 measures the elapsed time from reset timing under control of the CPU 101. An I/O port 105 inputs and outputs signals to and from the host device 130 illustrated in FIG. 1 and another external device. A bridge control unit 107 controls each unit of a bridge control circuit 110 based on a command from the CPU 101. A current limit control unit 112 controls a PWM signal generator 113 in such a way as to limit the current if necessary.

Here, the bridge control circuit 110 is configured as an integrated circuit. In the inside thereof, the PWM signal generator 113 generates a PWM signal based on the control by the bridge control unit 107 and supplies the generated signal to the H bridge circuit 20. The H bridge circuit 20 includes switching elements 2, 4, 6, 8, 15, and 17 that are, for example, FETs (Field-Effect Transistors). The PWM signal is an on/off signal to be applied as gate voltage to these switching elements 2, 4, 6, 8, 15, and 17. In the drawings, the switching elements 2, 4, 6, 8, 15, and 17 have lower terminals being source terminals and upper terminals being drain terminals.

The switching elements 2 and 4 are connected in series, and a DC power source 140 and a ground wire 142 are connected to this series circuit so that a predetermined voltage Vdd is applied. Similarly, the switching elements 6 and 8 are connected in series, and the voltage Vdd is applied to this series circuit. Diodes 12, 14, 16, and 18 are circular current diodes and are connected in parallel with the switching elements 2, 4, 6, and 8. The switching elements 15 and 17 are provided for current detection, and form a current mirror circuit together with the switching elements 4 and 8. Accordingly, currents proportional to currents flowing through the switching elements 4 and 8 flow through the switching elements 15 and 17, respectively.

The switching elements 2, 4, 6, and 8 may be configured to use their own parasitic diodes instead of the circular current diodes.

Voltage VMout0 at the connection point of the switching elements 2 and 4 is applied to one end of the stator winding 124 of the motor 120. Voltage VMout1 at the connection point of the switching elements 6 and 8 is applied to the other end of the stator winding 124. Therefore, a motor voltage VM being a difference between these two voltages (=voltage VMout0−voltage VMout1) is applied to the stator winding 124. Actually, the motor voltage VM is the X-phase voltage VMX and the Y-phase voltage VMY illustrated in FIG. 1.

A current detection unit 116 measures the value of current flowing through the switching elements 15 and 17 according to current direction and outputs a current measurement value Icoil of current flowing through the stator winding 124. A D/A converter 115 receives a digital value of reference current value Iref from the bridge control unit 107, and converts the received digital value into an analog value. A comparator 114 compares the current measurement value Icoil being an analog value with the reference current value Iref, and outputs a "1" signal if the former is equal to or greater than the latter and otherwise outputs a "0" signal.

However, chattering may occur in the output signal of the comparator 114 due to the influence of noise or the like. A current filter 111 is provided for removing this chattering. That is, when the output signal of the comparator 114 is switched, the current filter 111 waits for a predetermined filter period Tf and determines again whether the output signal of the comparator 114 is maintained at the value after the switching. If the determination result is affirmative, the value after the switching of this output signal is output as a threshold excess flag CL.

The voltages VMout0 and VMout1 are also supplied to an A/D converter 117 and a BEMF (back electromotive force) detection unit 118. The A/D converter 117 measures and outputs a back electromotive force Vbemf of the stator winding 124 based on the voltages VMout0 and VMout1. The back electromotive force Vbemf is used for step-out detection. When the motor voltage VM is the back electromotive force, the BEMF detection unit 118 outputs a flag ZC according to the switching of the voltage direction (zero cross). The case where the motor voltage VM is the back electromotive force is a period in which no voltage is applied from the H bridge circuit 20 to the stator winding 124.

Further, the bridge control unit 107 outputs a current control valid flag CLM. The current control valid flag CLM is "1" when the change of the PWM signal supplied from the H bridge circuit 20 is allowed and is "0" when the change is not allowed. Specifically, the current control valid flag CLM becomes "1" from time Tcs to time Tce after the start of a PWM period. When the current control valid flag CLM is "0", the current limit control unit 112 controls the PWM signal generator 113 in such a way as to maintain the present PWM signal.

Figure 3:
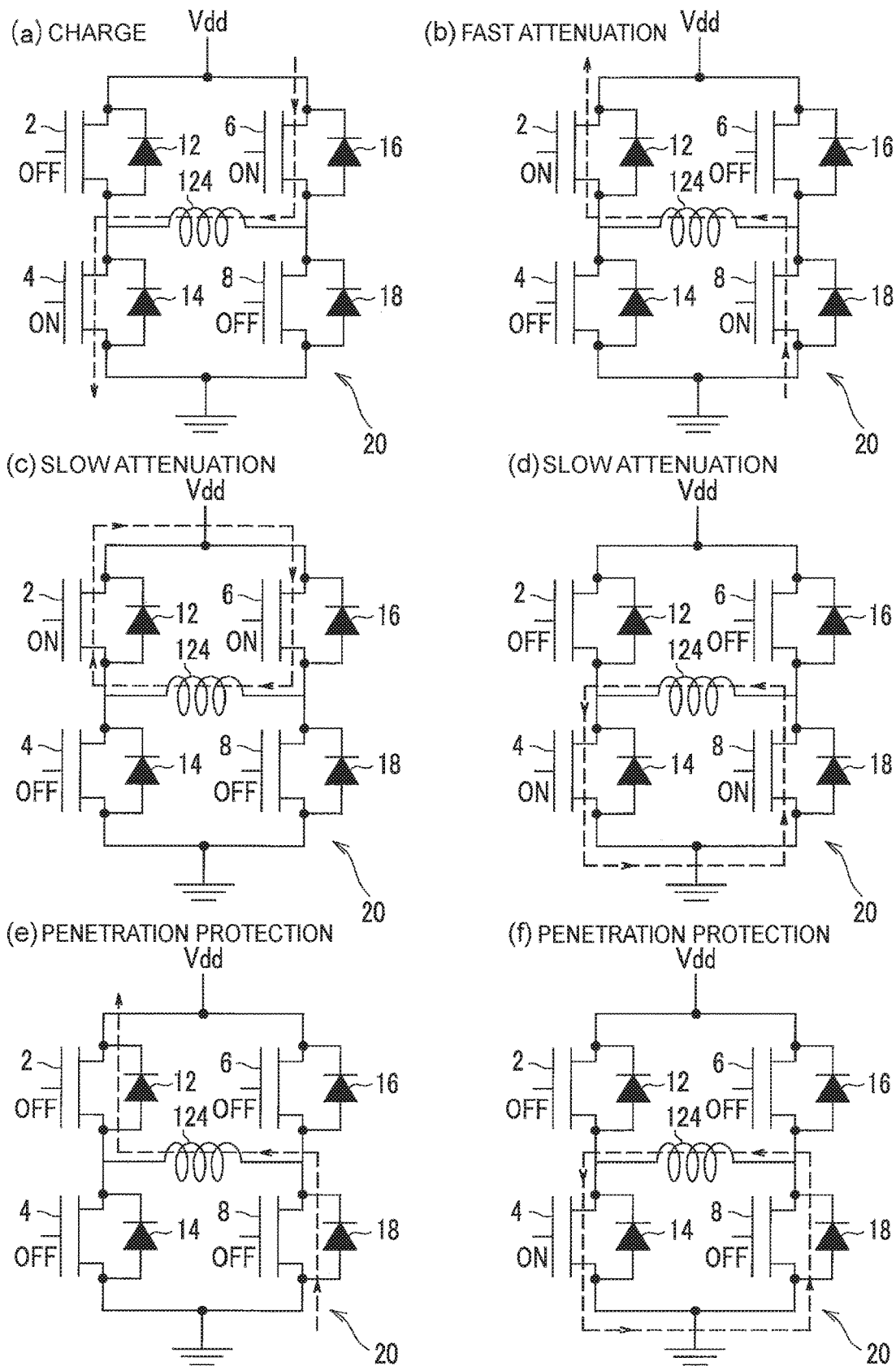
FIG. 3 An explanatory diagram illustrating operation modes of an H bridge circuit.

FIG. 3 is an explanatory diagram illustrating operation modes of the H bridge circuit 20.

FIGS. 3(a) to 3(f) are diagrams illustrating operation modes of the H bridge circuit 20.

FIG. 3(a) is a diagram illustrating a charge mode of the H bridge circuit 20.

In the case of increasing the absolute value of the motor current flowing through the stator winding 124, for example, the switching elements 4 and 6 that are diagonally opposed are turned on, and other switching elements 2 and 8 are turned off. In this state, the motor current flows in the direction indicated by a dashed line through the switching element 6, the stator winding 124, and the switching element 4, and the motor current increases. This operation mode is referred to as the "charge mode". From this state, in the case of attenuating the motor current at high rate, the mode shifts to a fast attenuation mode illustrated in FIG. 3(b).

FIG. 3(b) is a diagram illustrating the fast attenuation mode of the H bridge circuit 20.

In the case of attenuating the absolute value of the motor current flowing through the stator winding 124 at high rate, the switching elements 4 and 6 diagonally opposed are turned off and the switching elements 2 and 8 are turned on, as opposed to the previous charge mode. Since a back electromotive force is generated in the stator winding 124, the current flows in the direction indicated by a dashed line through the switching element 8, the stator winding 124, and the switching element 2, and the motor current is attenuated at high rate. This operation mode is referred to as the "fast attenuation mode".

Further, in the case of attenuating the current at low rate from the charge mode of FIG. 3(a) or the fast attenuation mode of FIG. 3(b), the mode shifts to a slow attenuation mode illustrated in FIG. 3(c).

FIG. 3(c) is a diagram illustrating the slow attenuation mode of the H bridge circuit 20.

In the case of attenuating the absolute value of the motor current flowing through the stator winding 124 at a rate slower than that in the fast attenuation mode, the switching elements 2 and 6 on the voltage Vdd side are turned on and the switching elements 4 and 8 on the ground side are turned off. As a result, as indicated by an illustrated dashed line, the current flows in such a way as to loop the switching elements 2 and 6 and the stator winding 124. This current is attenuated by the impedances of the switching elements 2 and 6 and the stator winding 124. The attenuation rate at this moment is slower than that in the fast attenuation mode. This operation mode is referred to as "the slow attenuation mode".

FIG. 3(d) is a diagram illustrating a variation of the slow attenuation mode of the H bridge circuit 20.

In the case of attenuating the absolute value of the motor current flowing through the stator winding 124 at a rate slower than that in the fast attenuation mode, the switching elements 2 and 6 on the voltage Vdd side may be turned off and the switching elements 4 and 8 on the ground side may be turned on. As a result, as indicated by an illustrated dashed line, motor current flows in such a way as to loop the switching elements 4 and 8 and the stator winding 124. This current is attenuated by the impedances of the switching elements 4 and 8 and the stator winding 124. The attenuation rate at this moment is slower than that in the fast attenuation mode.

By the way, even if the gate voltage of any switching element is turned off, this switching element remains in the ON state due to the parasitic capacitance of the gate. Therefore, for example, in the case of instantaneously switching from the charge mode (see FIG. 3(a)) to the fast attenuation mode (see FIG. 3(b)), all the switching elements are instantaneously turned on, and the voltage Vdd and the ground may be short-circuited and the switching elements may be destroyed. In order to prevent such a situation, the H bridge circuit 20 is set to an operation mode referred to as a "penetration protection mode".

FIG. 3(e) illustrates the penetration protection mode in which all the switching elements 2, 4, 6, and 8 are turned off.

When the charge mode of FIG. 3(a) is switched to the penetration protection mode of FIG. 3(e), a back electromotive force is generated in the stator winding 124, and therefore the motor current flows in the direction indicated by a dashed line through the diode 18, the stator winding 124, and the diode 12. In the penetration protection mode of FIG. 3(e), a power loss is generated according to the forward voltage drop of the diodes 12 and 18, and therefore the attenuation rate of the motor current becomes the largest.

Here, when the charge mode of FIG. 3(a) and the slow attenuation mode of FIG. 3(d) are compared with each other, the switching element 4 is in the ON state in any case. Therefore, in the case of shifting from the state of FIG. 3(a)

to the state of FIG. 3(d), the switching element 4 may remain in the ON state. Hence, in such a case, as illustrated in FIG. 3(f), it is possible to employ a penetration protection mode in which the switching element 4 is turned on and the switching elements 2, 6, and 8 are turned off. In this case, as indicated by an illustrated dashed line, the motor current flows in such a way as to loop the switching element 4, the diode 18, and the stator winding 124.

In the state of FIG. 3(f), a power loss is generated according to the forward voltage drop of the diode 18, and therefore the attenuation rate is larger than that in the slow attenuation mode. However, compared to the fast attenuation mode or the penetration protection mode of FIG. 3(e), the attenuation rate in FIG. 3(f) can be much lowered. It means that "greatly attenuating the motor current is not desirable" in the case of shifting the charge mode or the fast attenuation mode to the slow attenuation mode. Accordingly, as illustrated in FIG. 3(f), the penetration protection mode in which only one switching element is turned on is selected.

However, in FIG. 2, the operation mode designated from the CPU 101 to the bridge control unit 107 is any one of the charge mode, the slow attenuation mode, and the fast attenuation mode. Even in the control program described below, the penetration protection mode is not explicitly designated. However, the bridge control unit 107 does not immediately reflect the designated operation mode but constantly interposes the penetration protection mode (FIG. 3(e) or FIG. 3(f)) and controls the PWM signal generator 113.

In FIG. 2, the reference current value Iref to be supplied from the bridge control unit 107 to the D/A converter 115 is practically composed of X-phase reference current value IXref and Y-phase reference current value IYref. Setting examples of the reference current values IXref and IYref in one rotation of the stepping motor 120, that is, in a range from 0° to 360° in terms of mechanical angle $\theta_m$ and electrical angle $\theta$ are illustrated as dashed lines in FIGS. 4 and 5.

Figure 4:
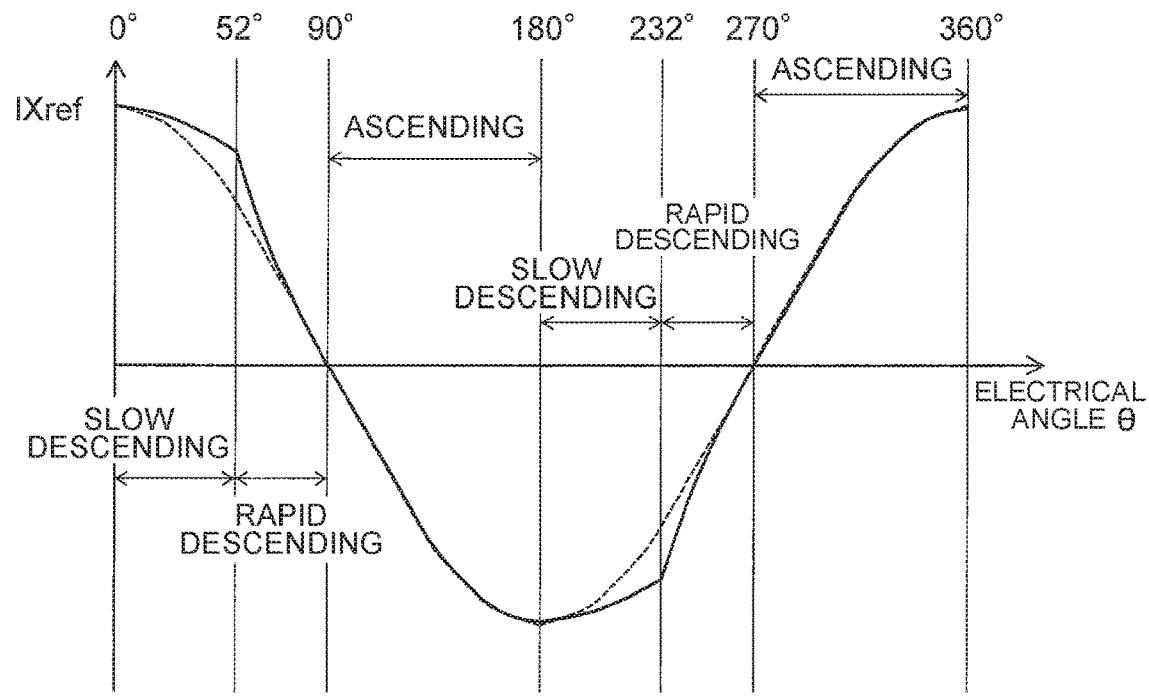
FIG. 4 A waveform diagram illustrating reference current value and motor current with respect to the electrical angle of an X-phase motor.

FIG. 4 is a waveform diagram illustrating the reference current value IXref and the motor current with respect to the electrical angle $\theta$ of the X-phase motor. A dashed line indicates the reference current value IXref and a solid line indicates the motor current. The reference current value IXref is a cosine curve, and practically has a waveform approximated by a staircase wave.

The method for driving the motor 120 by determining the reference current value IXref in this manner is referred to as a micro-step method, and has a feature that the residual vibration is small and excellent in stability especially at the time of low-speed rotation. In addition, the period in which the staircase wave varies is referred to as a micro-step cycle Tm. The micro-step cycle Tm is desirably the same as the PWM cycle or an integer multiple thereof. In order to simplify the description, in the present embodiment, it is assumed that the electrical angle of 1° coincides with the micro-step cycle.

The electrical angle exceeding 0° and not more than 52° is a period in which the absolute value of the motor current gradually decreases. At this moment, since the falling of the motor current is suppressed, the motor current keeps a predetermined gradient from about an electrical angle of 20°. The motor current increases away from the reference current value IXref.

The electrical angle exceeding 52° and not more than 90° is a period in which the absolute value of the motor current steeply decreases. At this moment, since the falling of the motor current is not suppressed, the motor current approaches the reference current value IXref and the difference converges.

The electrical angle exceeding 90° and not more than 180° is a period in which the absolute value of the motor current increases. At this moment, the motor current overlaps with the reference current value IXref.

Hereinafter, the motor current repeats slow descending, rapid descending, and ascending at the intervals of 180°.

The gentle descending period is not limited to the electrical angle exceeding 0° and not more than 52° and may be another predetermined range including an electrical angle of 45°. Another example of the gentle descending period may be an electrical angle exceeding 0° and not more than 60°.

Figure 5:
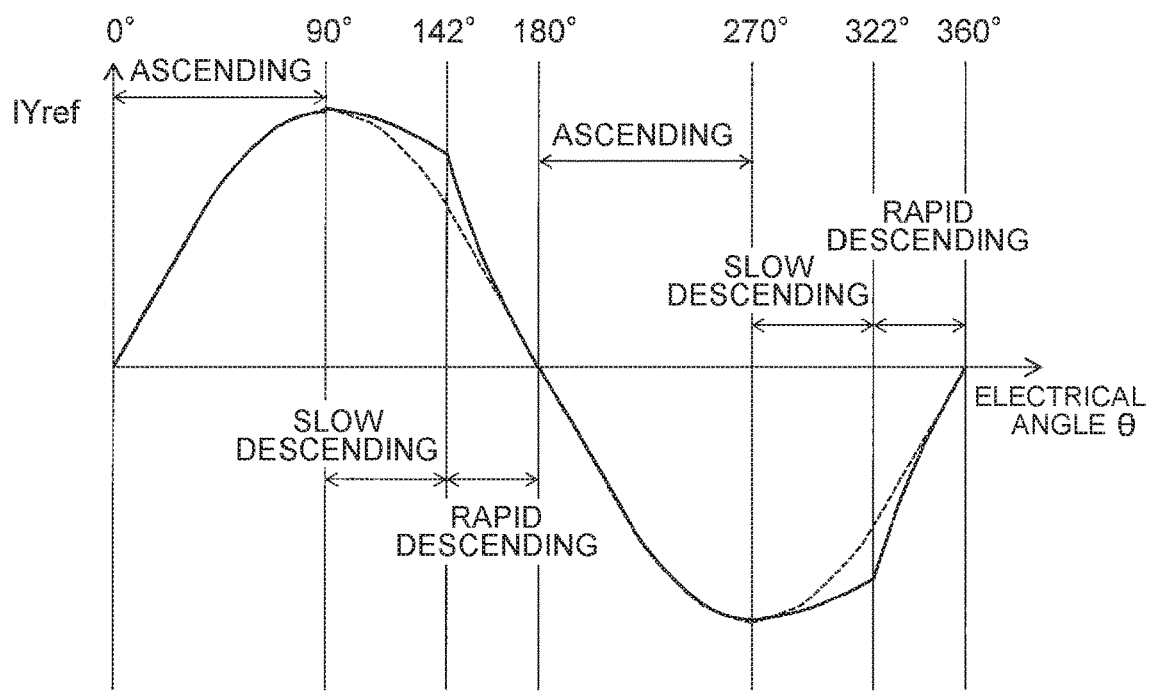
FIG. 5 A waveform diagram illustrating reference current value and motor current with respect to the electrical angle of a Y-phase motor.

FIG. 5 is a waveform diagram illustrating the reference current value IYref and the motor current with respect to the electrical angle of the Y-phase motor. The reference current value IYref is a sine curve and practically has a waveform approximated by a staircase wave.

The electrical angle exceeding 0° and not more than 90° is a period in which the absolute value of the motor current increases. At this moment, the motor current overlaps with the reference current value IYref.

The electrical angle exceeding 90° and not more than 142° is a period in which the absolute value of the motor current gradually decreases. At this moment, since the falling of the motor current is suppressed, the motor current keeps a predetermined gradient from about an electrical angle of 110°. The motor current increases away from the reference current value IYref.

The electrical angle exceeding 142° and not more than 180° is a period in which the absolute value of the motor current steeply decreases. At this moment, since the falling of the motor current is not suppressed, the motor current approaches the reference current value IYref and the difference converges.

Hereinafter, the motor current repeats ascending, slow descending, and rapid descending at the intervals of 180°.

The gentle descending period is not limited to the electrical angle exceeding 90° and not more than 142° and may be another predetermined range including an electrical angle of 135°. Another example of the gentle descending period may be an electrical angle exceeding 90° and not more than 150°.

Figures 6, 7:
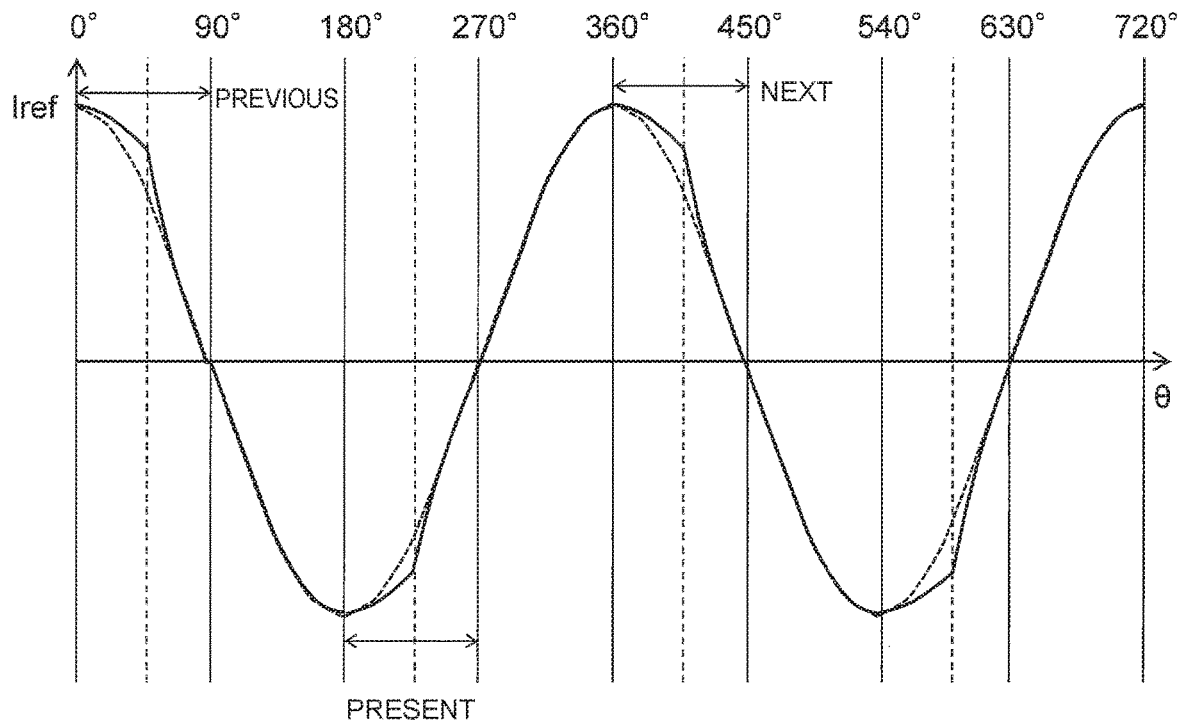
FIG. 6 A diagram illustrating current control data in each PWM cycle of a descending period to be controlled.
FIG. 7 A diagram illustrating gentle descending periods to be controlled and rapid descending periods.

FIG. 6 is a diagram illustrating current control data of each PWM cycle in a gentle descending period to be controlled and the rapid descending period. The current control data is stored, for example, in the bridge control unit 107.

The bridge control unit 107 stores in advance, in a memory, charge mode time TON_o of the previous rapid descending period prepared from rotor and stator positions corresponding to the number of PWMs in the rapid descending period, charge mode time TON of the present rapid descending period, and attenuation mode switching time Tfs. Charge mode times TON_o and TON and attenuation mode switching time Tfs of the gentle descending period are not stored in the memory.

The current control data is configured to include PWM cycle number indicating the order of PWM cycles, the charge mode time TON_o in the previous rotation period, the charge mode time TON in the present rotation period, and the attenuation mode switching time Tfs.

The PWM cycle number indicates the number of the PWM cycle synchronized with the rotation of the motor.

The previous rotation period indicates previous descending period. Therefore, the charge mode time TON_o indicates the time of the charge mode in each PWM cycle of the previous rapid descending period.

The present rotation period indicates the present rapid descending period. Therefore, the charge mode time TON indicates the time of the charge mode in each PWM cycle of the present rapid descending period.

The attenuation mode switching time Tfs indicates the timing for switching from the fast attenuation mode or the charge mode to the slow attenuation mode in the PWM cycle of the rapid descending period.

The bridge control unit 107 stores, in advance, current control data of each PWM cycle and further dynamically rewrites it with rotation driving.

FIG. 7 is a diagram illustrating gentle descending periods to be controlled and rapid descending periods. The vertical axis of the graph indicates the current value. The horizontal axis of the graph indicates the electrical angle θ. A dashed line indicates the reference current value Iref and a solid line indicates the motor current.

When the electrical angle θ of the present descending period is 180° to 270°, the electrical angle θ of the previous descending period is 0° to 90°, which is delayed by a half rotation. Then, the electrical angle θ of the next descending period is 360° to 450°, which is advanced by a half rotation. That is, the previous descending period is delayed by a half rotation with respect to the present descending period. The next descending period is advanced by a half rotation from the present descending period.

The electrical angle θ of the motor 120 and the PWM cycle are synchronously processed so that the same PWM cycle number becomes the same electrical angle θ in any descending period. This makes it possible to compare motor currents in the same number of PWM cycle between different descending periods.

Alternatively, the previous descending period and the next descending period may be shifted by one rotation (360°) with respect to the present descending period. In this case, the present descending period is delayed by one rotation with respect to the previous descending period. Further, the next descending period is advanced by one rotation compared to this. Thus, even when the rotor has asymmetry, suitably controlling is feasible.

Further, the previous descending period and the next descending period may be shifted by a natural number multiple of a half rotation (nπ) with respect to the present descending period. For example, when a periodic disturbance occurs every two rotations of the motor, this disturbance can be suitably suppressed.

Figure 8:
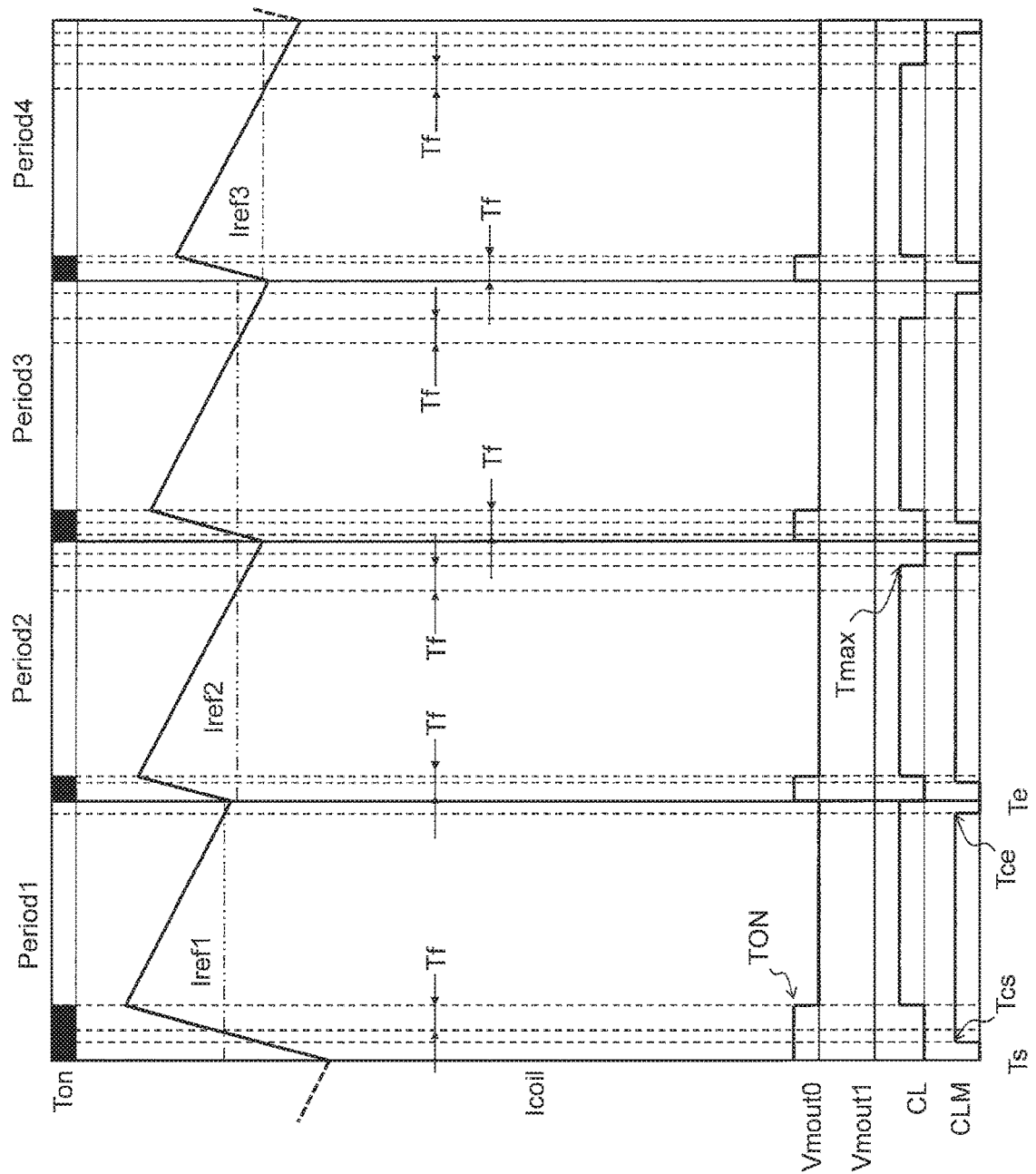
FIG. 8 A diagram illustrating exemplary PWM cycles of a gentle descending period to be controlled.

FIG. 8 is a diagram illustrating exemplary PWM cycles of a gentle descending period to be controlled. In FIG. 8, four PWM periods from Period 1 to Period 4 are illustrated.

In the uppermost part of FIG. 8, the period in which the operation mode in the gentle descending period is the charge mode is indicated by a black line. In this charge mode period, a charge mode flag Ton is "1".

The second part of FIG. 8 is a waveform diagram illustrating the current measurement value Icoil, in which reference current values Iref1 to Iref3 are indicated by two-dot chain lines. The solid line indicates the current measurement value Icoil in the gentle descending period.

Hereinafter, when the reference current values Iref1 to Iref3 are not particularly distinguished, they are simply referred to as the reference current value Iref. As indicated in Period 2 and Period 3, the reference current value Iref2 may be the same in a plurality of successive PWM cycles.

The third and fourth parts of FIG. 8 are waveform diagrams illustrating the voltages VMout0 and VMout1.

The fifth part of FIG. 8 illustrates the threshold excess flag CL that represents the internal state of the bridge control unit 107. The sixth part of FIG. 8 illustrates the current control valid flag CLM that represents the internal output of the bridge control unit 107.

First, the operation in the present gentle descending period from Period 1 to Period 2 will be described.

Time Ts is the timing at which the present PWM cycle starts. When each PWM cycle starts, the current control valid flag CLM starts with "0" having been set at the time Tce of the previous PWM cycle and the H bridge circuit 20 operates in the charge mode. The charge mode flag Ton changes to "1". The voltage VMout0 at this moment is at the voltage Vdd level, and the voltage VMout1 is at the ground level. The threshold excess flag CL is "0".

At the time Tcs after the time Ts, the current control valid flag CLM is switched to "1". Thus, the current limit control unit 112 controls the PWM signal generator 113 in such a way as to allow the change of the PWM signal. The current control valid flag CLM is "1" until the time Tce described below.

When the current measurement value Icoil exceeds the reference current value Iref1 after the time Tcs, and further when the filter period Tf elapses, the threshold excess flag CL changes to "1". When the threshold excess flag CL changes to "1", the charge mode terminates and the charge mode flag Ton changes to "0".

The charge mode time TON indicates a time during which the charge mode is continued. Based on the charge mode time TON, the deviation of the current measurement value Icoil with respect to the reference current value Iref1 can be measured. The charge mode time TON is a period in which the charge mode flag Ton is set to "1".

After the termination of the charge mode, the H bridge circuit 20 is switched to the slow attenuation mode. The voltage VMout0 at this moment is at the ground level. The voltage VMout1 is at the ground level. The threshold excess flag CL is "1".

Subsequently, although the current measurement value Icoil becomes smaller than the reference current value Iref1, Period 1 terminates before the filter period Tf elapses.

At the time Tce, the current control valid flag CLM is switched to "0". Thus, the current limit control unit 112 constantly controls the PWM signal generator 113 in the slow attenuation mode, without allowing the change of the PWM signal. In Period 1, since the H bridge circuit 20 is already in the slow attenuation mode, the operation mode does not change.

Time Te is the timing at which the PWM cycle of Period 1 terminates, and is the same timing as the time Ts at which the PWM cycle of Period 2 starts. Thereafter, a PWM cycle like that in Period 1 is executed. The PWM cycle processing in this gentle descending period will be described with reference to FIG. 11.

Figure 9:
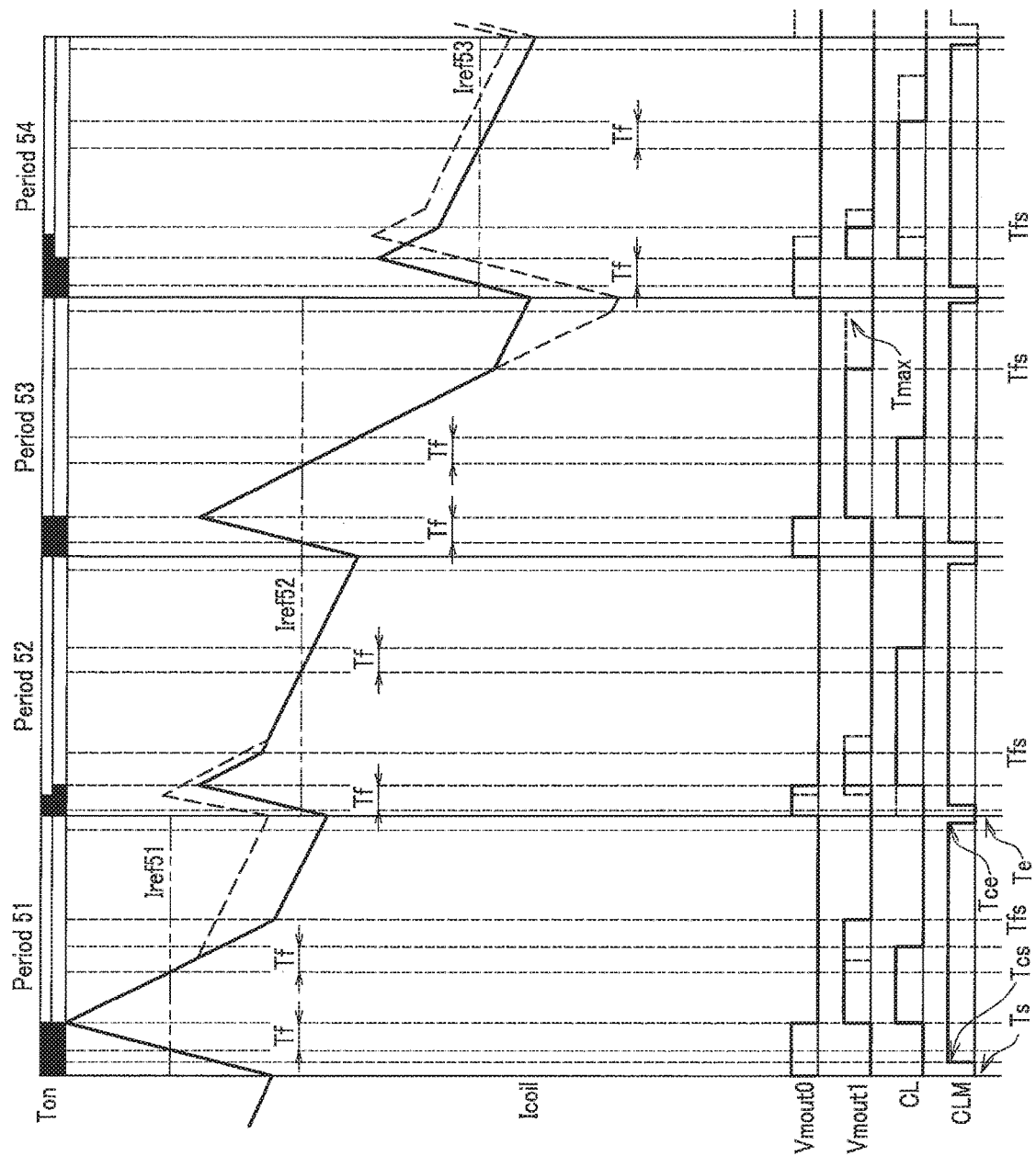
FIG. 9 A diagram illustrating exemplary PWM cycles of a rapid descending period to be controlled.

FIG. 9 is a diagram illustrating exemplary PWM cycles of a rapid descending period to be controlled. In FIG. 9, four PWM periods from Period 51 to Period 54 are illustrated.

In the uppermost part of FIG. 9, the period in which the operation mode in the previous rapid descending period is the charge mode is indicated by a black line. Further, the section in which the charge mode flag Ton is 1 is indicated. In the second part of FIG. 9, the period in which the operation mode in the present rapid descending period is the charge mode is indicated by a black line.

The third part of FIG. 9 is a waveform diagram illustrating the current measurement value Icoil, in which reference current values Iref51 to Iref53 are indicated by two-dot chain lines. The solid line indicates the current measurement value Icoil in the present rapid descending period, and the dashed line indicates the current measurement value Icoil in the previous rapid descending period.

Hereinafter, when the reference current values Iref51 to Iref53 are not particularly distinguished, they are simply referred to as the reference current value Iref. As indicated in Period 52 and Period 53, the reference current value Iref52 may be the same in a plurality of successive PWM cycles.

The fourth and fifth parts of FIG. 9 are waveform diagrams illustrating the voltages VMout0 and VMout1.

The sixth part of FIG. 9 illustrates the threshold excess flag CL that represents the internal state of the bridge control unit 107. The seventh part of FIG. 9 illustrates the current control valid flag CLM that represents the internal output of the bridge control unit 107. In each waveform diagram, the solid line indicates the value in the present rapid descending period and the dashed line indicates the value in the previous rapid descending period.

First, the operation in the present rapid descending period from Period 51 to Period 52 will be described.

The time Ts is the timing at which the present PWM cycle starts. When each PWM cycle starts, the current control valid flag CLM starts with "0" having been set at the time Tce of the previous PWM cycle and the H bridge circuit 20 operates in the charge mode. The voltage VMout0 at this moment is at the voltage Vdd level, and the voltage VMout1 is at the ground level. The charge mode flag Ton changes to "1". The threshold excess flag CL is "0".

At the time Tcs after the time Ts, the current control valid flag CLM is switched to "1". Thus, the current limit control unit 112 controls the PWM signal generator 113 in such a way as to allow the change of the PWM signal. The current control valid flag CLM is "1" until the time Tce described below.

When the current measurement value Icoil exceeds the reference current value Iref51 after the time Tcs, and further when the filter period Tf elapses, the threshold excess flag CL changes to "1". When the threshold excess flag CL changes to "1", the charge mode terminates and the charge mode flag Ton changes to "0".

The charge mode time TON indicates a time during which the charge mode is continued. Based on the charge mode time TON, the deviation of the current measurement value Icoil with respect to the reference current value Iref51 can be measured. The charge mode time TON is a period in which the charge mode flag Ton is set to "1".

After the termination of the charge mode, the H bridge circuit 20 is switched to the fast attenuation mode. The voltage VMout0 at this moment is at the ground level. The voltage VMout1 is at the voltage Vdd level. The threshold excess flag CL is "1".

Subsequently, the current measurement value Icoil becomes smaller than the reference current value Iref51 and further, when the filter period Tf elapses, the threshold excess flag CL changes to "0".

At the attenuation mode switching time Tfs, the H bridge circuit 20 is switched to the slow attenuation mode. The voltages VMout0 and VMout1 at this moment are at the ground level. A different value is applied to the attenuation mode switching time Tfs for each PWM cycle. By appropriately setting the attenuation mode switching time Tfs, the motor current in each PWM cycle can be suitably attenuated in such a way as to approach the reference current value Iref. The attenuation mode switching time Tfs is longer than the time Tcs and shorter than time Tmax described below.

At the time Tce, the current control valid flag CLM is switched to "0". Thus, the current limit control unit 112 constantly controls the PWM signal generator 113 in the slow attenuation mode, without allowing the change of the PWM signal. In Period 51, since the H bridge circuit 20 is already in the slow attenuation mode, the operation mode does not change.

The time Te is the timing at which the PWM cycle of Period 51 terminates, and is the same timing as the time Ts at which the PWM cycle of Period 52 starts. Thereafter, a PWM cycle like that in Period 51 is executed.

Next, differences in operation will be described in comparison with the previous rapid descending period indicated by the dashed line from Period 51 to Period 52. In the previous rapid descending period, the H bridge circuit 20 is switched from the fast attenuation mode to the slow attenuation mode at an earlier timing compared with the present rapid descending period. At the timing when the PWM cycle of Period 52 starts, the current measurement value Icoil is lower than that in the previous rapid descending period and is closer to the reference current value Iref52. The charge mode time TON_o of the previous rapid descending period in Period 52 is shorter than the charge mode time TON of the present rapid descending period.

Next, the operation in the previous rapid descending period from Period 53 to Period 54 will be described.

As understood from the current measurement value Icoil of the previous rapid descending period indicated by a dashed line in Period 53, the H bridge circuit 20 is switched to the slow attenuation mode for the first time at the time Tmax. That is, the time Tmax is equal to the attenuation mode switching time Tfs.

As indicated by the current measurement value Icoil of the present rapid descending period indicated by the solid line, the H bridge circuit 20 is switched to the slow attenuation mode at the attenuation mode switching time Tfs that is earlier than that in the previous rapid descending period. Therefore, the current measurement value Icoil is closer to the reference current value Iref53 compared to the previous rapid descending period.

This is because in the present rapid descending period the attenuation of the current measurement value Icoil one step before (one PWM cycle before, i.e., Period 53) is smaller and therefore the charge mode is started from a higher current value in Period 54. Conversely, the shortness in charge mode time TON means that the attenuation of the current measurement value Icoil one step before is small. That is, the attenuation of coil current can be determined by the charge mode time TON.

As illustrated in Period 53 to Period 54, when the attenuation mode switching time Tfs is long, the period of the fast attenuation mode becomes longer, and the attenuation of the current measurement value Icoil becomes larger. Conversely, when the attenuation mode switching time Tfs is short, the period of the fast attenuation mode becomes shorter, and the attenuation of the current measurement value Icoil becomes smaller.

Therefore, the current measurement value Icoil can be suitably brought close to the reference current value Iref by shortening the attenuation mode switching time Tfs one step before (one PWM cycle before) in such a way as to cancel the increase in the charge mode time TON. Processing for realizing this will be described with reference to the following FIGS. 13 to 15.

Figure 10:
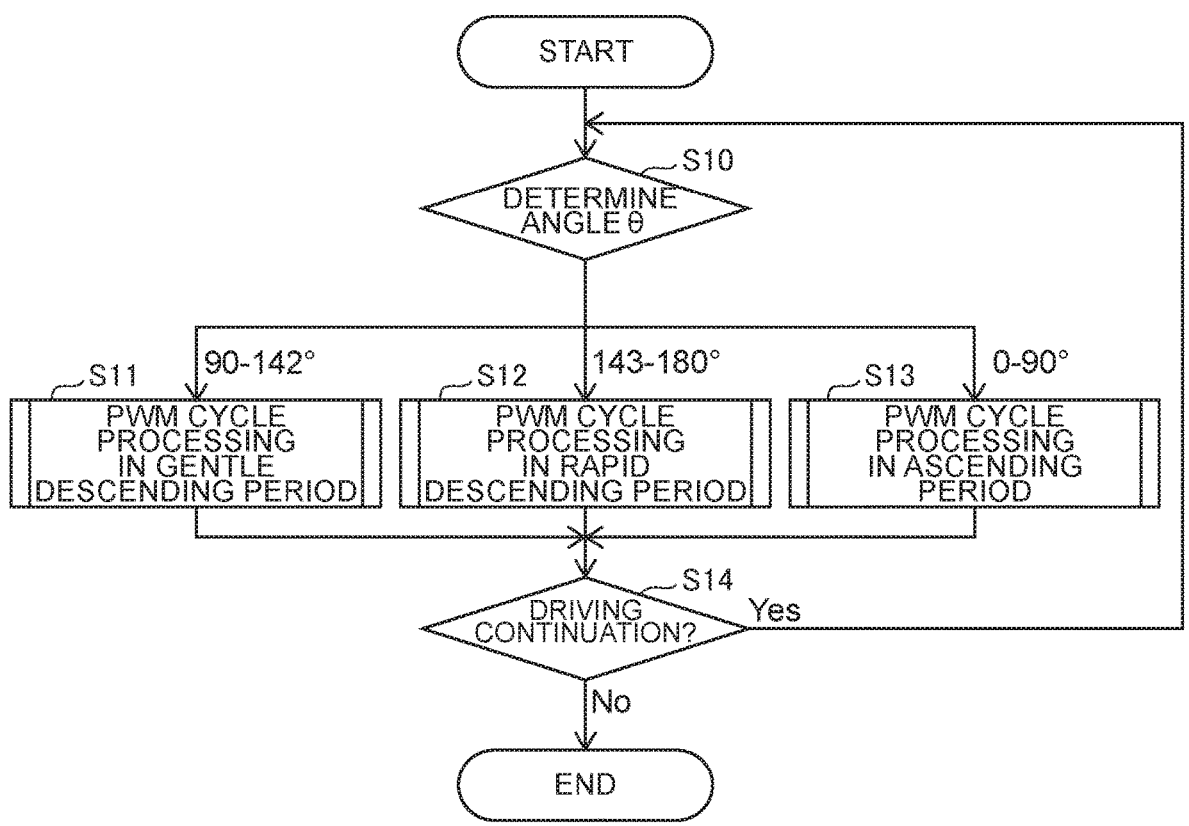
FIG. 10 A flowchart illustrating a branch processing routine according to the electrical angle of a motor.

FIG. 10 is a flowchart illustrating a branch processing routine according to the electrical angle of the motor.

FIG. 10 illustrates processing to be executed by the CPU 101 based on the control program stored in the ROM 103 and is activated by a drive instruction of a host device (not illustrated). Hereinafter, Y-phase control will be described exemplarily. The X-phase control is different from the Y-phase control only in the determination condition of the electrical angle θ by 90°.

In step S10, the CPU 101 determines the electrical angle θ.

When the electrical angle θ exceeds 90° and is not more than 142°, the processing of the CPU 101 proceeds to step S11 to execute PWM cycle processing in the gentle descending period. The PWM cycle processing in the gentle descending period will be described with reference to FIGS. 11 and 12. The case where the electrical angle θ is 90° is a case where the reference current value starts descending. The case where the electrical angle is 142° corresponds to an angle of +52° rotation after the reference current value has started descending.

Subsequently, if it is determined to continue the driving (Yes in step S14), the processing of the CPU 101 returns to step S10. If it is not determined to continue the driving (No in step S14), the CPU 101 terminates the processing of FIG. 10.

When the electrical angle θ exceeds 142° and is not more than 180°, the processing of the CPU 101 proceeds to step S12 to execute PWM cycle processing in the rapid descending period. The PWM cycle processing in the rapid descending period will be described below with reference to FIGS. 13 and 14. The case where the electrical angle is 90° is a case where the descending of the reference current value terminates.

Subsequently, if it is determined to continue the driving (Yes in step S14), the processing of the CPU 101 returns to step S10. If it is not determined to continue the driving (No in step S14), the CPU 101 terminates the processing illustrated in FIG. 10.

When the electrical angle θ exceeds 0° and is not more than 90°, the processing of the CPU 101 proceeds to step S13 to execute PWM cycle processing in an ascending period. Subsequently, if it is determined to continue the driving (Yes in step S14), the processing of the CPU 101 returns to step S10. If it is not determined to continue the driving (No in step S14), the CPU 101 terminates the processing illustrated in FIG. 10.

Figure 11:
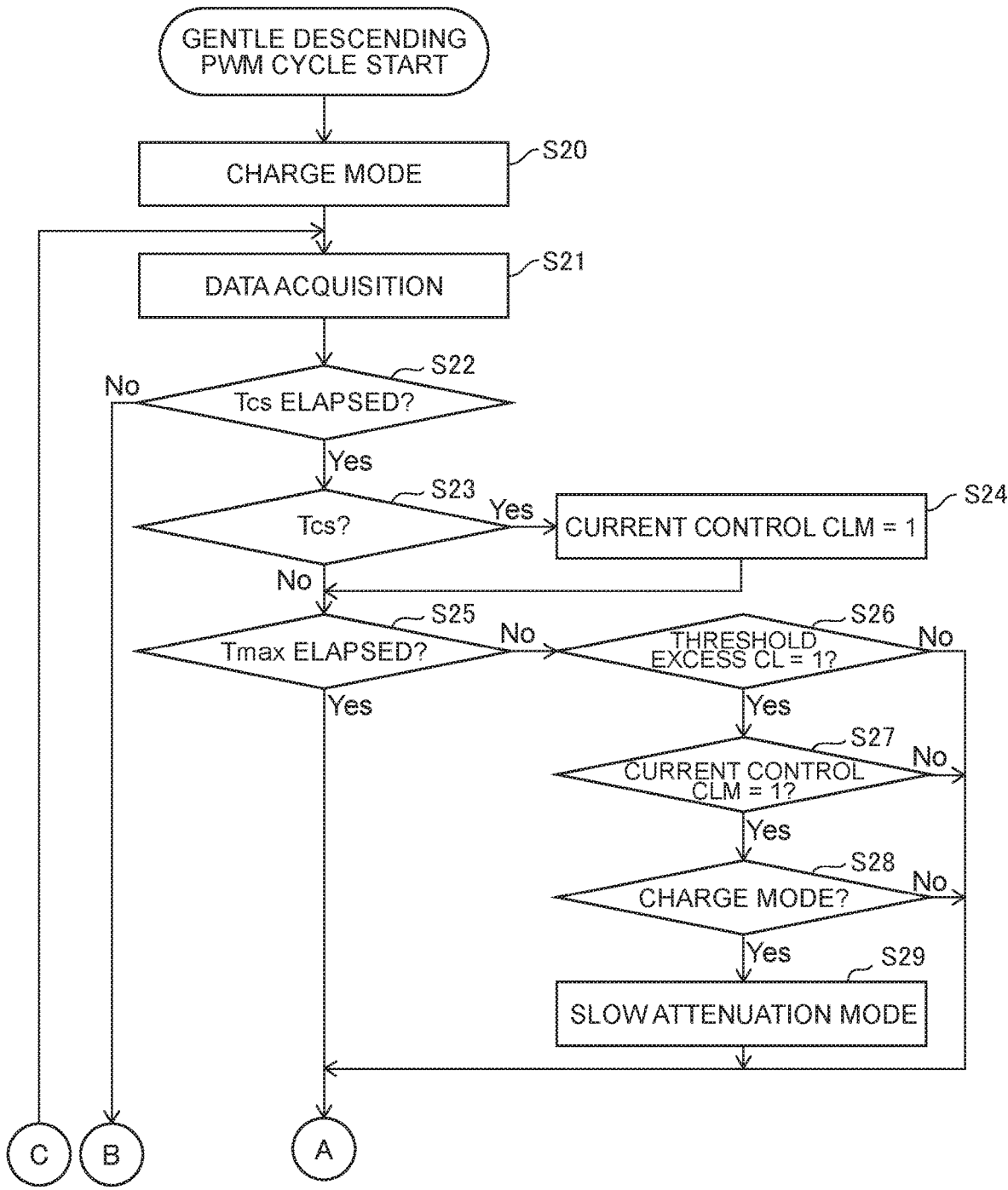
FIG. 11 A flowchart (Part 1) illustrating a PWM cycle processing routine in a gentle descending period.
Figure 12:
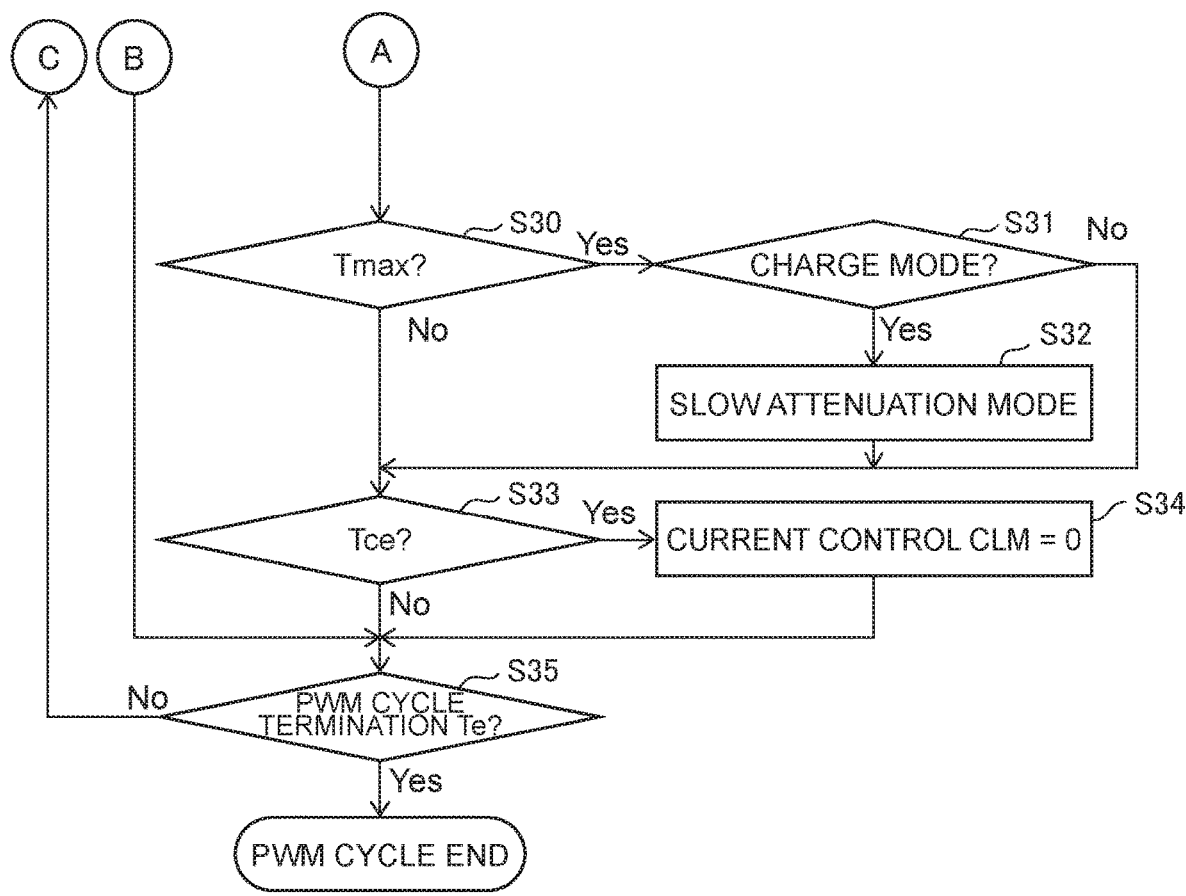
FIG. 12 A flowchart (Part 2) illustrating the PWM cycle processing routine in the gentle descending period.

FIGS. 11 and 12 are flowcharts illustrating a PWM cycle processing routine in the gentle descending period. In the description of this processing, the timing diagram of the gentle descending period illustrated in FIG. 8 will be referred to appropriately.

FIGS. 11 and 12 illustrate processing to be executed by the CPU 101 based on the control program stored in the ROM 103, and is activated every PWM cycle in the gentle descending period.

When the processing of the rapid descending period control routine is started, the timer 104 is reset, and thereafter the time elapsed after starting the PWM cycle is counted. Further, based on an estimated value of the electrical angle θ of the rotor 126 and the waveform illustrated in FIG. 4 or FIG. 5, the reference current value Iref in the PWM cycle is determined. The determined reference current value Iref is set in the bridge control unit 107 (see FIG. 2).

Further, the current control valid flag CLM is in a state of "0" being set in the previous PWM cycle. The current control valid flag CLM having been set in the previous PWM cycle is continuously used in the present PWM cycle. In the previous PWM cycle, the current control valid flag CLM is set to "0" because of executing step S34 of FIG. 12 described below. The processing in step S34 will be described in detail below.

In step S20, the PWM signal generator 113 causes the H bridge circuit 20 to operate in the charge mode.

Next, in step S21, the current limit control unit 112 acquires the threshold excess flag CL. In this routine, the threshold excess flag CL does not change until the processing in step S21 is executed again.

(Processing for Enabling Current Control at Time Tcs)

Steps S22 to S24 are processing for enabling current control at the time Tcs of FIG. 8.

In step S22, the bridge control unit 107 determines whether the time Tcs has elapsed, and if the determination condition is not met (No), the processing proceeds to step S35.

By the above processing in step S20, the H bridge circuit 20 operates in the charge mode at the start of the PWM cycle. Further, by the processing in step S22, the period from the time Ts at which the PWM cycle starts to the time Tcs becomes a minimum ON time.

If no minimum ON time is present, the current waveform may drop largely. That is, since the ripple of the current waveform increases, the torque loss, vibration, and noise of the motor increase. In contrast, in the present embodiment, since the operation mode is set to the charge mode from the start of the PWM cycle to the time Tcs, the current ripple of the motor current can be suppressed. Thus, not only the driving efficiency of the motor can be increased but also the torque loss, noise, vibration, and the like of the motor can be reduced.

In step S23, the bridge control unit 107 determines whether the time is Tcs, and if the determination condition is met (Yes), then in step S24, the current control valid flag CLM is set to "1". The current control valid flag CLM is referred to in step S34 of FIG. 12 described below.

(Slow Attenuation Mode Shifting Processing Before Time Tmax)

Steps S25 to S29 are processing for shifting from the charge mode to the slow attenuation mode before the time Tmax in FIG. 8 elapses.

In step S25, the bridge control unit 107 determines whether the time Tmax has elapsed, and if the determination condition is met (Yes), the processing proceeds to step S26.

In step S26, the current limit control unit 112 determines whether the threshold excess flag CL is "1", and if the determination condition is not met (No), the processing proceeds to step S30 of FIG. 12.

In step S27, the current limit control unit 112 determines whether the current control valid flag CLM is "1", and if the determination condition is not met (No), the processing proceeds to step S30 of FIG. 12.

Next, in step S28, the bridge control unit 107 determines whether the H bridge circuit 20 is operating in the charge mode, and if the determination condition is not met (No), the processing proceeds to step S30 of FIG. 12.

In step S29, the PWM signal generator 113 instructs the H bridge circuit 20 to operate in the slow attenuation mode, and the processing proceeds to step S30 of FIG. 12.

(Slow Attenuation Mode Shifting Processing at Time Tmax After Time Tcs)

Steps S30 to S32 are processing for shifting from the charge mode to the slow attenuation mode at the time Tmax of FIG. 8.

In step S30, the bridge control unit 107 determines whether the time is Tmax, and if the determination condition is not met (No), the processing proceeds to step S33.

Next, in step S31, the bridge control unit 107 determines whether the H bridge circuit 20 is operating in the charge mode. If the determination condition is met (Yes), then in step S32, the PWM signal generator 113 instructs the H bridge circuit 20 to operate in the slow attenuation mode.

(Next Cycle Preparation Processing at Time Tce)

Steps S33 and S34 are processing for preparing the next PWM cycle at the time Tce of FIG. 9.

In step S33, the bridge control unit 107 determines whether the time is Tce, and if the determination condition is not met (No), the processing proceeds to step S35. If the determination condition is met (Yes), then in step S34, the current control valid flag CLM is set to "0". The current control valid flag CLM having been set in step S34 is continuously used in the next PWM cycle.

In step S35, the bridge control unit 107 determines whether the time is Te at which the present PWM cycle terminates. If the determination condition is not met (No), the processing of the bridge control unit 107 returns to step S21 of FIG. 11 to repeat the processing of this PWM cycle. If the determination condition is met (Yes), the bridge control unit 107 terminates the processing of the present PWM cycle.

Figure 13:
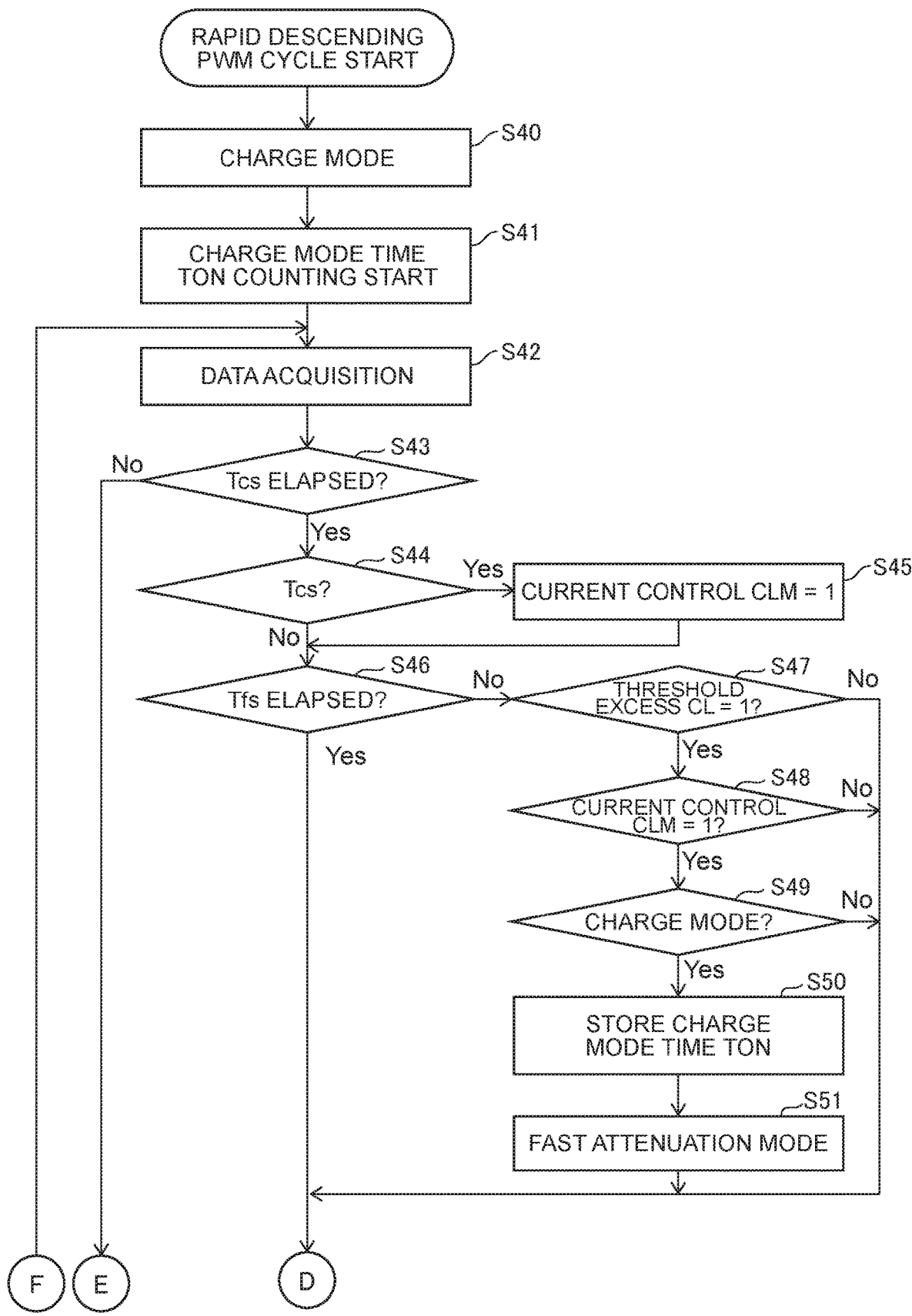
FIG. 13 A flowchart (Part 1) illustrating a PWM cycle processing routine in a rapid descending period.
Figure 14:
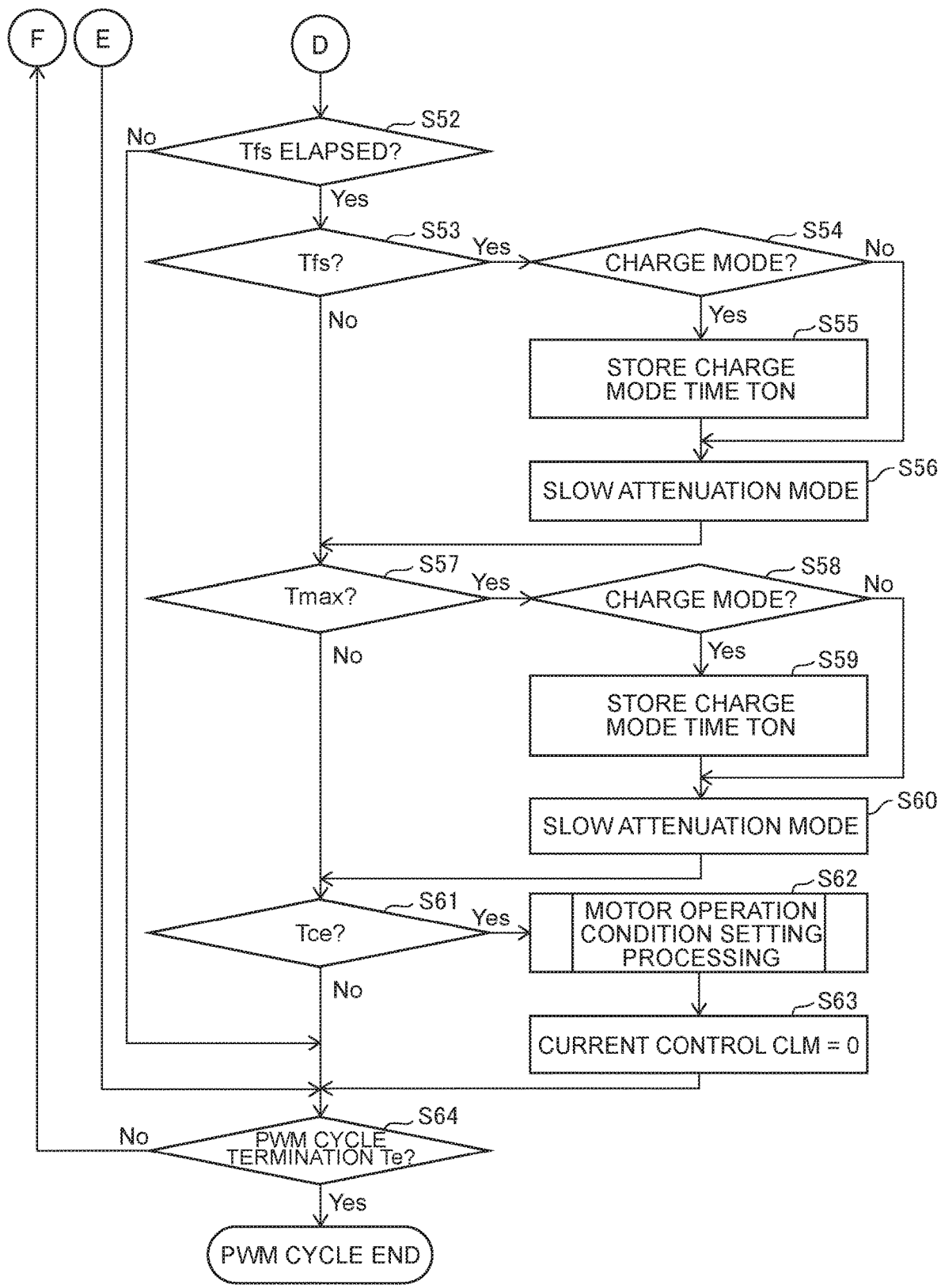
FIG. 14 A flowchart (Part 2) illustrating the PWM cycle processing routine in the rapid descending period.

FIGS. 13 and 14 are flowcharts illustrating a PWM cycle processing routine in the rapid descending period. In the description of this processing, the timing diagram of the rapid descending period illustrated in FIG. 9 will be referred to appropriately.

FIGS. 13 and 14 illustrate processing to be executed by the CPU 101 based on the control program stored in the ROM 103, and is activated every PWM cycle in the rapid descending period.

When the processing of the rapid descending period control routine is started, the timer 104 is reset, and thereafter the time elapsed after starting the PWM cycle is counted. Further, based on an estimated value of the electrical angle θ of the rotor 126 and the waveform illustrated in FIG. 4 or FIG. 5, the reference current value Iref in the PWM cycle is determined. The determined reference current value Iref is set in the bridge control unit 107 (see FIG. 2).

Further, the current control valid flag CLM is in a state of "0" being set in the previous PWM cycle. The current control valid flag CLM having been set in the previous PWM cycle is continuously used in the present PWM cycle. In the previous PWM cycle, the current control valid flag CLM is set to "0" because of executing step S63 described below. The processing in step S63 will be described in detail below.

In step S40, the PWM signal generator 113 causes the H bridge circuit 20 to operate in the charge mode. In step S41, the bridge control unit 107 starts counting the charge mode time TON.

Next, in step S42, the bridge control unit 107 acquires the elapsed time from the timer 104, and further the current limit control unit 112 acquires the threshold excess flag CL. In this routine, the elapsed time and the threshold excess flag CL do not change until the processing in step S42 is executed again.

(Processing for Enabling Current Control at Time Tcs)

Steps S43 to S45 are processing for enabling current control at the time Tcs of FIG. 9.

In step S43, the bridge control unit 107 determines whether the time Tcs has elapsed, and if the determination condition is not met (No), the processing proceeds to step S64 of FIG. 14.

By the above processing in step S40, the H bridge circuit 20 operates in the charge mode at the start of the PWM cycle. Further, by the processing in step S43, the period from the time Ts at which the PWM cycle starts to the time Tcs becomes a minimum ON time.

If no minimum ON time is present, the current waveform may drop largely. That is, since the ripple of the current waveform increases, the torque loss, vibration, and noise of the motor increase. In contrast, in the present embodiment, since the operation mode is set to the charge mode from the start of the PWM cycle to the time Tcs, the current ripple of the motor current can be suppressed. Thus, not only the driving efficiency of the motor can be increased but also the torque loss, noise, vibration, and the like of the motor can be reduced.

In step S44, the bridge control unit 107 determines whether the time is Tcs, and if the determination condition is met (Yes), then in step S45, the current control valid flag CLM is set to "1". The current control valid flag CLM is referred to in step S48 described below.

(Fast Attenuation Mode Shifting Processing After Time Tcs and Before Attenuation Mode Switching Time Tfs)

Steps S46 to S51 are processing for shifting from the charge mode to the fast attenuation mode after the time Tcs and before the attenuation mode switching time Tfs in FIG. 9.

In step S46, the bridge control unit 107 determines whether the time Tfs has elapsed, and if the determination condition is met (Yes), the processing proceeds to step S52 of FIG. 14.

In step S47, the current limit control unit 112 determines whether the threshold excess flag CL is "1", and if the determination condition is not met (No), the processing proceeds to step S52 of FIG. 14.

In step S48, the current limit control unit 112 determines whether the current control valid flag CLM is "1", and if the determination condition is not met (No), the processing proceeds to step S52 of FIG. 14.

Next, in step S49, the bridge control unit 107 determines whether the H bridge circuit 20 is operating in the charge mode, and if the determination condition is not met (No), the processing proceeds to step S52 of FIG. 14.

In step S50, the bridge control unit 107 stores the charge mode time TON, and in step S51, the PWM signal generator 113 instructs the H bridge circuit 20 to operate in the fast attenuation mode. Subsequently, the processing of the bridge control unit 107 proceeds to step S52 of FIG. 14.

(Slow Attenuation Mode Shifting Processing After Time Tcs and at Attenuation Mode Switching Time Tfs)

Steps S52 to S56 illustrated in FIG. 14 are processing for shifting from the charge mode or the fast attenuation mode to the slow attenuation mode after the time Tcs and at the attenuation mode switching time Tfs of FIG. 9.

In step S52, the bridge control unit 107 determines whether the attenuation mode switching time Tfs has elapsed, and if the determination condition is not met (No), the processing proceeds to step S64.

In step S53, the bridge control unit 107 determines whether the time is attenuation mode switching time Tfs, and if the determination condition is not met (No), the processing proceeds to step S57.

Next, in step S54, the bridge control unit 107 determines whether the H bridge circuit 20 is operating in the charge mode, and if the determination condition is met (Yes), then in step S55, the bridge control unit 107 stores the charge mode time TON.

Further in step S56, the PWM signal generator 113 instructs the H bridge circuit 20 to operate in the slow attenuation mode. By this processing, at the attenuation mode switching time Tfs in Periods 51 to 54 of FIG. 9, the current measurement value Icoil indicated by the solid line is switched from a steep attenuation to a gentle attenuation. In FIG. 9, although the attenuation mode switching time Tfs in the previous descending period is not illustrated, for example, in Periods 52 and 54, the current measurement value Icoil indicated by the dashed line is switched from a steep attenuation to a gentle attenuation. This switching time is the attenuation mode switching time Tfs of the previous descending period.

(Slow Attenuation Mode Shifting Processing at Time Tmax After Times Tcs and Tfs)

Steps S57 to S60 are processing for shifting from the charge mode or the fast attenuation mode to the slow attenuation mode at the time Tmax after the time Tcs and the attenuation mode switching time Tfs in FIG. 9.

In step S57, the bridge control unit 107 determines whether the time is Tmax, and if the determination condition is not met (No), the processing proceeds to step S61.

Next, in step S58, the bridge control unit 107 determines whether the H bridge circuit 20 is operating in the charge mode, and if the determination condition is met (Yes), then in step S59, the bridge control unit 107 stores the charge mode time TON.

Further, in step S60, the PWM signal generator 113 instructs the H bridge circuit 20 to operate in the slow attenuation mode. By this processing, at the time Tmax in Period 53 of FIG. 9, the current measurement value Icoil indicated by the dashed line is switched from a steep attenuation to a gentle attenuation.

(Next Cycle Preparation Processing at Time Tce After Times Tcs and Tfs)

Steps S61 to S63 are processing for preparing the next PWM cycle at the time Tce after the time Tcs and the attenuation mode switching time Tfs of FIG. 9.

In step S61, the bridge control unit 107 determines whether the time is Tce, and if the determination condition is not met (No), the processing proceeds to step S64. If the determination condition is met (Yes), then in step S62, motor operation condition setting and attenuation mode switching time setting (see FIG. 15) are performed for the next PWM cycle, and in step S63, the current control valid flag CLM is set to "0". The current control valid flag CLM having been set in step S63 is continuously used in the next PWM cycle.

In step S64, the bridge control unit 107 determines whether the time is Te at which the present PWM cycle terminates. If the determination condition is not met (No), the processing of the bridge control unit 107 returns to step S42 of FIG. 13 to repeat the processing of this PWM cycle. If the determination condition is met (Yes), the bridge control unit 107 terminates the processing of the present PWM cycle.

Figure 15:
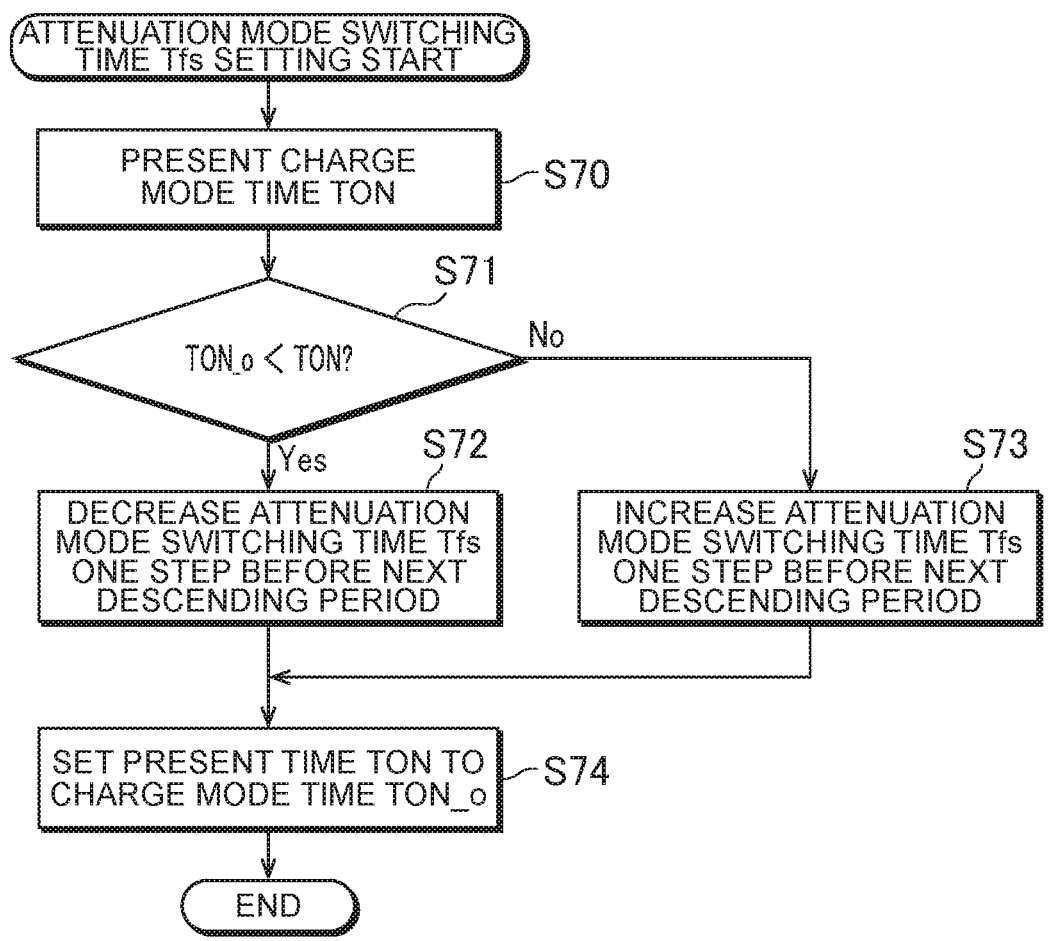
FIG. 15 A flowchart illustrating setting of attenuation mode switching time.

FIG. 15 is a flowchart illustrating setting of the attenuation mode switching time. Here, details of attenuation mode switching time setting performed in the motor operation condition setting processing in step S62 of FIG. 14 will be described.

In step S70, the bridge control unit 107 acquires the charge mode time TON of the present PWM cycle.

In step S71, the bridge control unit 107 determines whether the charge mode time TON is longer than the charge mode time TON_o of the PWM cycle having the same number in the previous descending period. If the bridge control unit 107 determines that the charge mode time TON is longer than the previous charge mode time TON_o (Yes), the processing proceeds to step S72. If the bridge control unit 107 determines that the charge mode time TON is not longer than the previous charge mode time TON_o (No), the processing proceeds to step S73.

In step S72, the bridge control unit 107 decreases the attenuation mode switching time Tfs one step before the next descending period by a predetermined amount, and then the processing proceeds to step S74. Here, the attenuation mode switching time Tfs one step before means the PWM cycle number is smaller by 1.

In step S73, the bridge control unit 107 increases the attenuation mode switching time Tfs one step before the next descending period by a predetermined amount.

In step S74, the bridge control unit 107 sets the charge mode time TON to the charge mode time TON_o. Thus, the present charge mode time TON is referred to as the charge mode time TON_o in the next descending period. When processing of step S74 terminates, the bridge control unit 107 terminates the processing of FIG. 15.

In this attenuation mode switching time setting, the attenuation mode switching time Tfs one step before the next descending period is changed so that the charge mode time TON of the next descending period with respect to the present descending period is stabilized. Thus, in the next descending period, the current measurement value Icoil can be brought close to the reference current value Iref.

Figure 16:
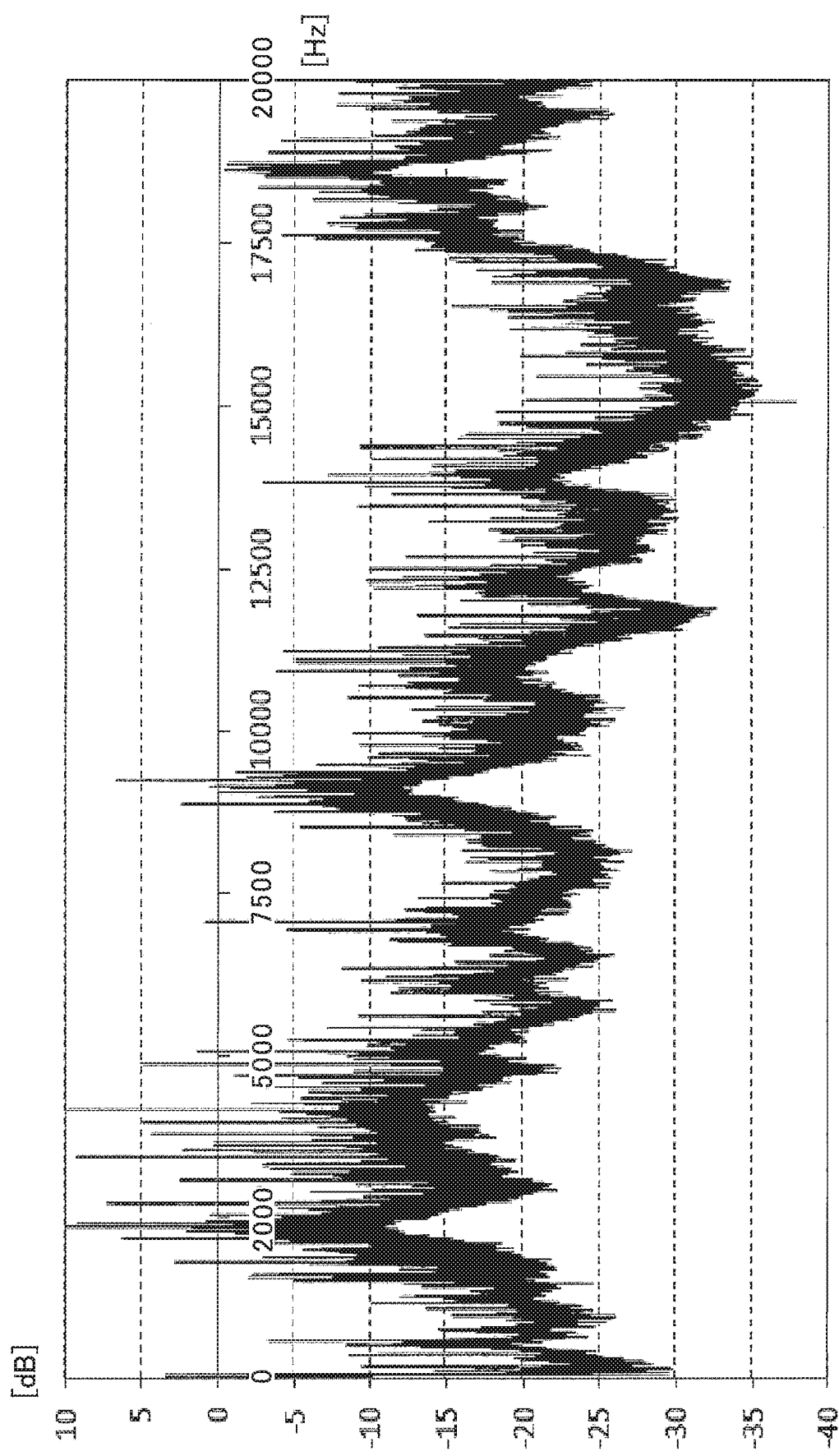
FIG. 16 A diagram illustrating a noise spectrum of a comparative example.
Figure 17:
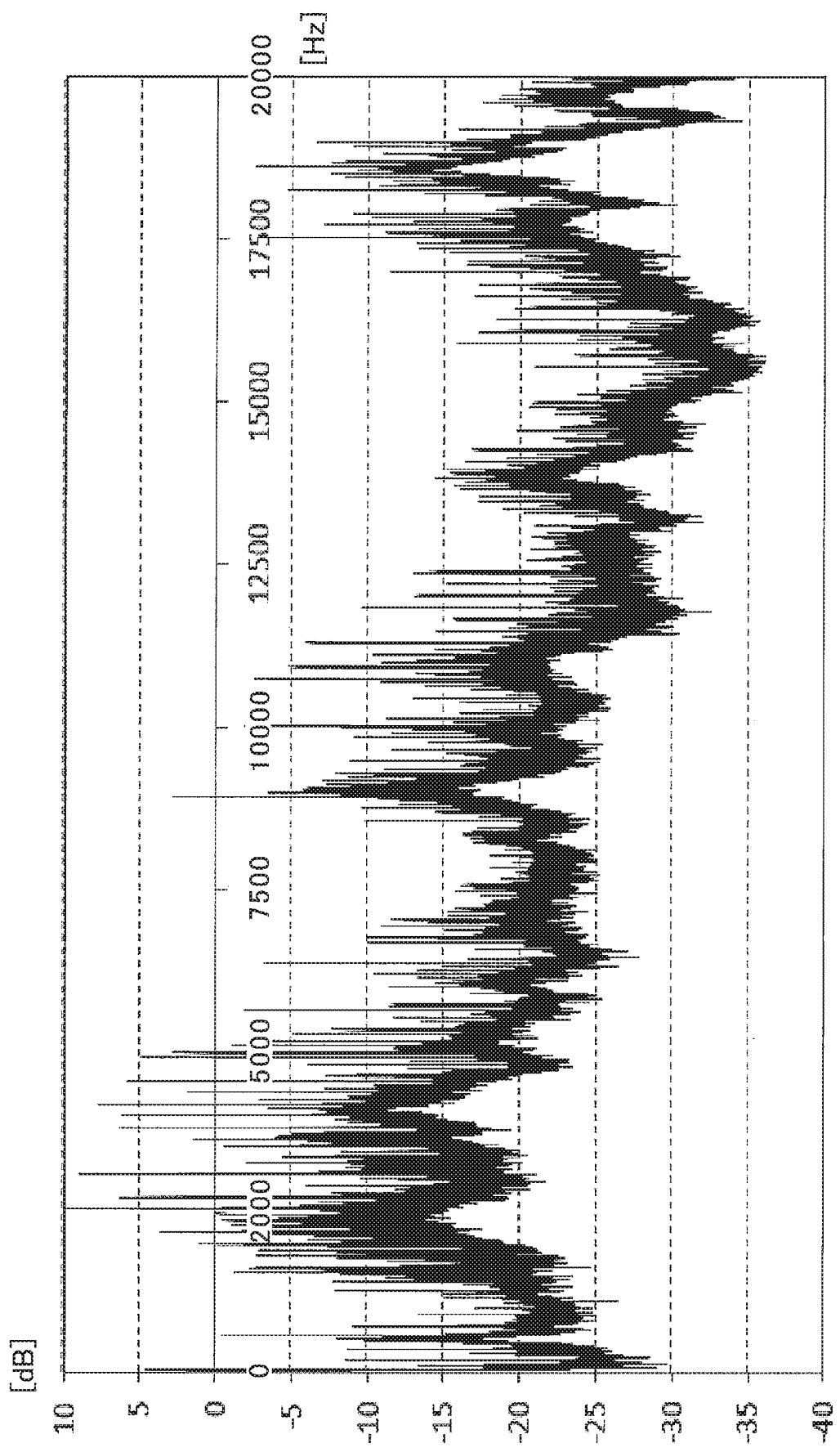
FIG. 17 A diagram illustrating a noise spectrum of the present embodiment.

FIG. 16 is a diagram illustrating a noise spectrum of a comparative example, and FIG. 17 is a diagram illustrating a noise spectrum of the present embodiment. In FIGS. 16 and 17, the horizontal axis of the graph indicates the frequency. The vertical axis of the graph indicates noises during motor driving.

The noise spectrum of the comparative example indicates noise components when the PWM cycle processing illustrated in FIGS. 13 and 14 is executed in the descending period of the motor current. In the noise spectrum of the present embodiment, noises of 9 KHz to 1.5 KHz can be suppressed as compared with the comparative example. Since the noises of 9 KHz to 1.5 KHz is in an audible range, the quietness of the motor can be enhanced by suppressing the noises.

Modified Embodiment

The present invention is not limited to the above-described embodiment, and can be modified without departing from the spirit of the present invention, for example, like the following (a) to (e).

(a) The above-described embodiment is based on software processing using the program. However, it may be realized by hardware processing using ASIC (Application Specific Integrated Circuit), FPGA (field-programmable gate array), or the like.

(b) FETs are applied as switching elements configuring the H bridge circuit 20, in the above-described embodiment. However, they may be replaced by bipolar transistors, IGBTs (insulated gate bipolar transistors), or other switching elements.

(c) Further, in the above-described embodiment, the bipolar two-phase stepping motor is exemplarily applied as the motor 120, but various types and the number of phases may be applied for the motor 120 depending on the application.

(d) In the above-described embodiment, although the microstep method is employed as the method for setting the reference current value Iref, the reference current value Iref may have a value continuously variable depending on the electrical angle θ.

(e) The present invention is not limited to the two-pole stepping motor of the above-described embodiment and may be applied to a stepping motor having four or more poles. In the case of two-pole stepping motor, the mechanical angle $\theta_m$ and the electrical angle $\theta$ coincide with each other. In the four-pole stepping motor, the electrical angle $\theta$ is twice the mechanical angle $\theta_m$.

LIST OF REFERENCE SIGNS 2, 4, 6, 8, 15, 17 switching element
12, 14, 16, 18 diode
20, 20X, 20Y H bridge circuit
100 motor control device (exemplary motor current control device)
101 CPU (control means)
102 RAM
103 ROM
104 timer
105 I/O port
106 bus
107 bridge control unit (part of control means)
110 bridge control circuit
111 current filter (part of control means)
112 current limit control unit (part of control means)
113 PWM signal generator (part of control means)
114 comparator
115 D/A converter
116 current detection unit
117 A/D converter
118 BEMF detection unit
120 motor
122XP, 122XN, 122YP, 122YN stator (exemplary motor coil)
124X, 124Y, 124 stator winding
126 rotor
130 host device
140 DC power source
142 ground wire

The invention claimed is:

1. A motor current control device characterized by comprising:

an H bridge circuit having a switching element and connected to a motor coil provided in a motor; and
control means for driving the switching element every predetermined PWM cycle and designating, for the H bridge circuit, an operation mode as any one of a charge mode for increasing motor current flowing in the motor coil, a fast attenuation mode for attenuating the motor current, and a slow attenuation mode for attenuating the motor current at a rate slower than the rate in the fast attenuation mode,
wherein the control means sets a reference current value for each PWM cycle from a positional relationship between a rotor and a stator,
in a range from an electrical angle where the reference current value starts descending to a predetermined electrical angle, the control means switches the H bridge circuit to the charge mode and subsequently switches to the slow attenuation mode, for each PWM cycle, and
in a range from the predetermined electrical angle to an electrical angle where the reference current value starts ascending, if the motor current exceeds the reference current value after switching to the charge mode, the control means switches the H bridge circuit to the fast attenuation mode and further to the slow attenuation mode, for each PWM cycle.

2. The motor current control device according to claim 1, characterized in that when the electrical angle where the reference current value starts descending is 0°, the predetermined electrical angle is 60°.

3. The motor current control device according to claim 1, characterized in that when the electrical angle where the reference current value starts descending is 0°, the predetermined electrical angle is 52°.

4. A motor current control device characterized by comprising:

an H bridge circuit having a switching element and connected to a motor coil provided in a motor; and
control means for driving the switching element every predetermined PWM cycle and designating, for the H bridge circuit, an operation mode as any one of a charge mode for increasing motor current flowing in the motor coil, a fast attenuation mode for attenuating the motor current, and a slow attenuation mode for attenuating the motor current at a rate slower than the rate in the fast attenuation mode,
wherein the control means sets a reference current value for each PWM cycle from a positional relationship between a rotor and a stator, suppresses the descending rate of the motor current so that a difference between the motor current and the reference current value increases, in a range from an electrical angle where the reference current value starts descending to a predetermined electrical angle, and does not suppress the descending rate of the motor current so that the difference between the motor current and the reference current value decreases, in a range from the predetermined electrical angle to an electrical angle where the reference current value starts ascending.

5. A motor current control method for a motor current control device including an H bridge circuit having a switching element and connected to a motor coil provided in a motor, and control means for driving the switching element every predetermined PWM cycle and designating, for the H bridge circuit, an operation mode as any one of a charge mode for increasing motor current flowing in the motor coil, a fast attenuation mode for attenuating the motor current, and a slow attenuation mode for attenuating the motor current at a rate slower than the rate in the fast attenuation mode, the method being characterized by:
causing the control means to execute a step of setting a reference current value for each PWM cycle from a positional relationship between a rotor and a stator;
in a range from an electrical angle where the reference current value starts descending to a predetermined electrical angle, the method causing the control means to execute a step of switching the H bridge circuit to the slow attenuation mode after a step of switching to the charge mode, for each PWM cycle; and
in a range from the predetermined electrical angle to an electrical angle where the reference current value starts ascending, if the motor current exceeds the reference current value after the step of switching the H bridge circuit to the charge mode, the method causing the control means to execute a step of switching to the fast attenuation mode and further a step of switching to the slow attenuation mode, for each PWM cycle.

* * * * *